US012342076B2

(12) United States Patent
Tadano et al.

(10) Patent No.: US 12,342,076 B2
(45) Date of Patent: Jun. 24, 2025

(54) IMAGE PROCESSING APPARATUS AND IMAGE PROCESSING METHOD

(71) Applicant: SONY GROUP CORPORATION, Tokyo (JP)

(72) Inventors: Ryuichi Tadano, Tokyo (JP); Takayoshi Ozone, Kanagawa (JP); Hiroshi Yamamoto, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 108 days.

(21) Appl. No.: 17/904,480

(22) PCT Filed: Jan. 22, 2021

(86) PCT No.: PCT/JP2021/002233
§ 371 (c)(1),
(2) Date: Aug. 17, 2022

(87) PCT Pub. No.: WO2021/171848
PCT Pub. Date: Sep. 2, 2021

(65) Prior Publication Data
US 2023/0103051 A1 Mar. 30, 2023

(30) Foreign Application Priority Data
Feb. 27, 2020 (JP) ................. 2020-031353

(51) Int. Cl.
H04N 23/68 (2023.01)
H04N 23/62 (2023.01)
H04N 23/63 (2023.01)

(52) U.S. Cl.
CPC .......... H04N 23/683 (2023.01); H04N 23/62 (2023.01); H04N 23/631 (2023.01); H04N 23/6811 (2023.01)

(58) Field of Classification Search
CPC .... H04N 23/683; H04N 23/62; H04N 23/631; H04N 23/6811
See application file for complete search history.

(56) References Cited

U.S. PATENT DOCUMENTS

2008/0246848 A1* 10/2008 Tsubaki .................... G06T 7/20
348/208.4
2015/0022678 A1* 1/2015 Tsubaki ............... H04N 23/687
348/208.5
(Continued)

FOREIGN PATENT DOCUMENTS

| JP | 2015-022027 A | 2/2015 |
| JP | 2015-095670 A | 5/2015 |
| JP | 2015-216510 A | 12/2015 |

OTHER PUBLICATIONS

International Search Report and Written Opinion of PCT Application No. PCT/JP2021/002233, issued on Apr. 13, 2021, 09 pages of ISRWO.

Primary Examiner — Christopher K Peterson
(74) Attorney, Agent, or Firm — CHIP LAW GROUP

(57) ABSTRACT

An image processing apparatus performs shake information processing of outputting output shake information for input image data constituting a movie, shake information normalization processing of obtaining normalization shake information by normalizing the output shake information on the basis of angle of view information, and shake change processing of changing a shake state of the input image data using the normalization shake information.

16 Claims, 23 Drawing Sheets

(56) References Cited

U.S. PATENT DOCUMENTS

2017/0208252 A1\* 7/2017 Tamura .................... A61B 1/05
2018/0270412 A1\* 9/2018 Kanda .................. H04N 23/632

\* cited by examiner

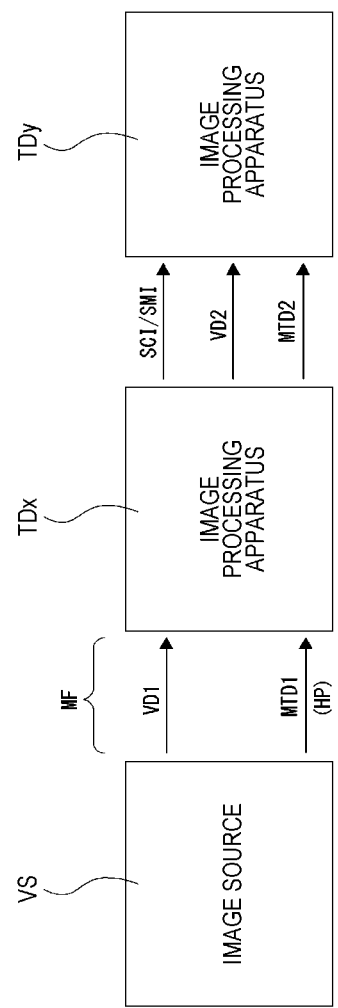

FIG. 12A

| Header |
| Sound |
| Movie | frame#1 / frame#2 / frame#3 / ... |
| Meta data | frame#1 / frame#2 / frame#3 / ... |

| IMU data | gyro |
| | accel |
| | SAMPLING RATE |
| DISTORTION CORRECTION PARAMETER | LENS DISTORTION CORRECTION |
| | TRAPEZOIDAL DISTORTION CORRECTION |
| | FOCAL PLANE DISTORTION CORRECTION |
| COORDINATE TRANSFORMATION PARAMETER (HP) | ELECTRICAL IMAGE STABILIZATION (yaw/pitch/roll) |
| | OPTICAL IMAGE STABILIZATION (yaw/pitch/roll) |
| TIMING INFORMATION (TM) | EXPOSURE TIME (shutter speed) |
| | EXPOSURE START TIMING |
| | READ TIME (CURTAIN SPEED) |
| | NUMBER OF EXPOSURE FRAMES (LONG SECOND EXPOSURE INFORMATION) |
| | IMU SAMPLE TIMING OFFSET |
| | FRAME RATE |
| CAMERA PARAMETER (CP) | ANGLE OF VIEW (FOCAL LENGTH) |
| | ZOOM POSITION |
| | LENS DISTORTION INFORMATION |

FIG. 12C

| gyro sample #1 |
| gyro sample #2 |
| ... |
| gyro sample #n |

| accel sample #1 |
| accel sample #2 |
| ... |
| accel sample #m |

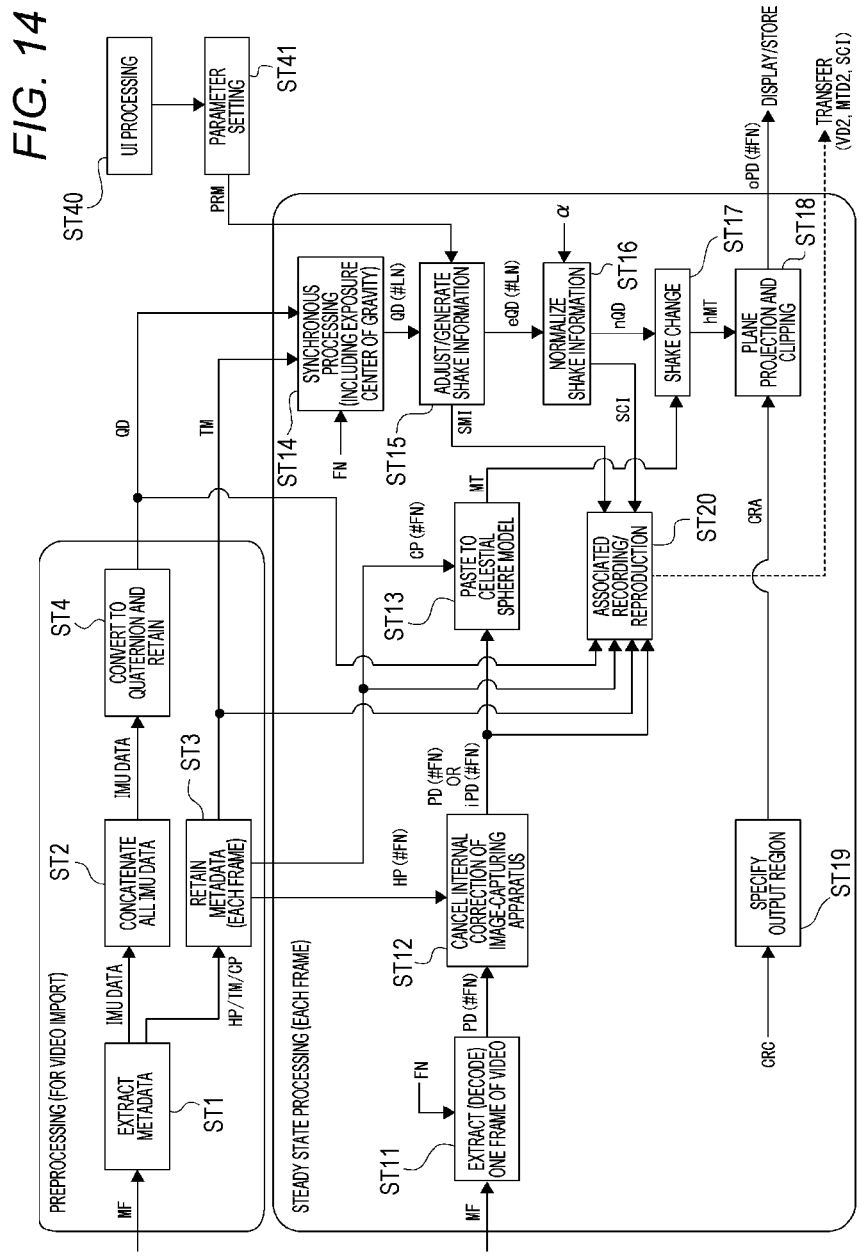

RELATIONSHIP BETWEEN Imager PLANE
AND THE ANGLE OF INCIDENCE

PROCESS IN OUTPUT COORDINATE PLANE

CONVERT TO
NORMALIZED SPACE

FIG. 21A
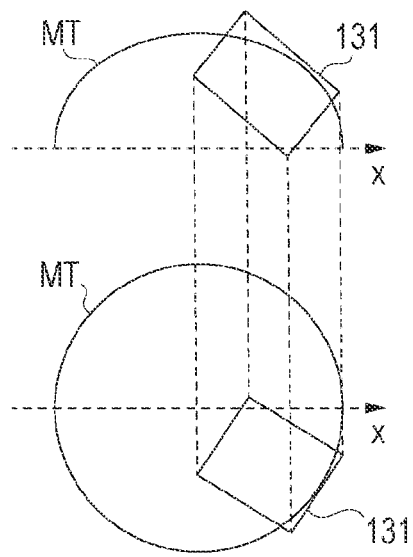
ROTATION
FIG. 21B
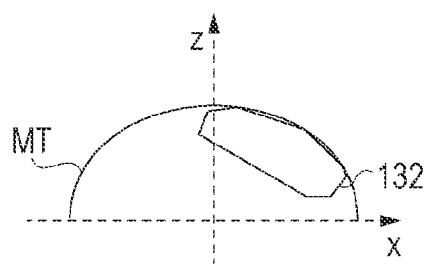
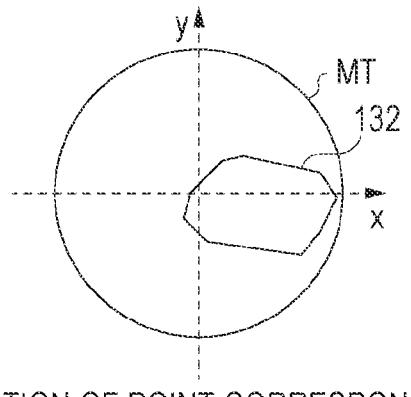
CALCULATION OF POINT CORRESPONDING TO
CELESTIAL SPHERE IN PERSPECTIVE PROJECTION

FIG. 23

MTD1

| IMU data | | gyro |
|---|---|---|
| | | accel |
| | | SAMPLING RATE |
| | DISTORTION CORRECTION PARAMETER | LENS DISTORTION CORRECTION |
| | | TRAPEZOIDAL DISTORTION CORRECTION |
| | | FOCAL PLANE DISTORTION CORRECTION |
| COORDINATE TRANSFORMATION PARAMETER (HP) | | ELECTRICAL IMAGE STABILIZATION (yaw/pitch/roll) |
| | | OPTICAL IMAGE STABILIZATION (yaw/pitch/roll) |
| TIMING INFORMATION (TM) | | EXPOSURE TIME (shutter speed) |
| | | EXPOSURE START TIMING |
| | | READ TIME (CURTAIN SPEED) |
| | | NUMBER OF EXPOSURE FRAMES (LONG SECOND EXPOSURE INFORMATION) |
| | | IMU SAMPLE TIMING OFFSET |
| | | FRAME RATE |
| CAMERA PARAMETER (CP) | | ANGLE OF VIEW (FOCAL LENGTH) |
| | | ZOOM POSITION |
| | | LENS DISTORTION INFORMATION |

MTD2

| NORMALIZATION QUATERNION (nQD) | |
|---|---|
| QUATERNION (QD) | |
| TIMING INFORMATION (TM) | EXPOSURE TIME (shutter speed) |
| | EXPOSURE START TIMING |
| | READ TIME (CURTAIN SPEED) |
| | NUMBER OF EXPOSURE FRAMES (LONG SECOND EXPOSURE INFORMATION) |
| | IMU SAMPLE TIMING OFFSET |
| | FRAME RATE |
| CAMERA PARAMETER (CP) | ANGLE OF VIEW (FOCAL LENGTH) |
| | ZOOM POSITION |
| | LENS DISTORTION INFORMATION |

IMAGE PROCESSING APPARATUS AND IMAGE PROCESSING METHOD

CROSS REFERENCE TO RELATED APPLICATIONS

This application is a U.S. National Phase of International Patent Application No. PCT/JP2021/002233 filed on Jan. 22, 2021, which claims priority benefit of Japanese Patent Application No. JP 2020-031353 filed in the Japan Patent Office on Feb. 27, 2020. Each of the above-referenced applications is hereby incorporated herein by reference in its entirety.

TECHNICAL FIELD

The present technology relates to an image processing apparatus, an image processing method, and a program, and particularly relates to image processing for an image shake.

BACKGROUND ART

A technology for performing image processing such as various corrections on a movie captured by an image-capturing apparatus is known.

Patent Document 1 below discloses performing vibration-proof processing to image data related to a photographed image, and eliminating the influence of the vibration-proof processing to the image data after the vibration-proof processing.

CITATION LIST

Patent Document

Patent Document 1: Japanese Patent Application Laid-Open No. 2015-216510

SUMMARY OF THE INVENTION

Problems to be Solved by the Invention

By the way, in recent years, a user can easily perform image capturing, image adjustment, and the like using a mobile terminal such as a smartphone or a tablet, a camera itself, a personal computer, or the like, and movie posting is also active.

Under such an environment, it is desired not to output an image captured by the user as it is but to produce an image with higher quality or various images. Furthermore, it is also desired that a broadcaster and the like can perform various production of images.

For example, applying a shake to an image in accordance with the content of a movie is one technique of production for extending image expression. Here, even assuming a case where it is desired to generate an image with an intentional shake by adding a shake or by not completely removing a shake to leave it, the degree of shake may look different depending on the angle of view of the target image.

Therefore, the present disclosure proposes a technology that enables generation of an image to which a shake of a target shake degree is applied in a case where a shake is added or adjusted in a movie.

Solutions to Problems

An image processing apparatus according to the present technology includes: a shake information processing unit configured to output output shake information for input image data constituting a movie; a shake information normalization unit configured to obtain normalization shake information by normalizing the output shake information on the basis of angle of view information; and a shake change unit configured to perform shake change processing of changing a shake state of the input image data using the normalization shake information.

The shake change processing is to change the state of shake by reducing the shake occurring in the movie or adding a shake. The shake change unit performs shake change processing on the basis of output shake information, and in this case, output shake information normalized according to the angle of view of the image expressing the shake is used.

In the image processing apparatus according to the present technology described above, it is conceivable that the shake change unit performs shake addition to the input image data on the basis of the normalization shake information as the shake change processing.

That is, as one aspect of shake change, shake addition is performed on the image.

In the image processing apparatus according to the present technology described above, it is conceivable that the shake change unit performs shake partial removal of the input image data on the basis of the normalization shake information as the shake change processing.

That is, as one aspect of shake change, shake partial removal of the image is performed. The shake removal is to remove a shake applied to a moving image, such as a shake occurring in an image due to a motion (camera shake or the like) of an image-capturing apparatus at the time of image capturing, for example, and a part of the shake is removed. That is, shake partial removal is to reduce a shake without completely removing the shake.

In the image processing apparatus according to the present technology described above, it is conceivable that the angle of view information is a ratio between an angle of view of a target image to be subjected to the shake change processing and a reference angle of view.

A certain reference angle of view is determined, and shake information is normalized using a ratio of the angle of view to the reference angle of view.

In the image processing apparatus according to the present technology described above, it is conceivable that the angle of view information is a ratio of an image to be subjected to the shake change processing between an angle of view after clipping and an angle of view at the time of image capturing.

In a case where an output image is generated by performing clipping from a captured image, shake information with respect to a clipped image is normalized with reference to an angle of view of a captured image.

In the image processing apparatus according to the present technology described above, it is conceivable to include a parameter setting unit configured to set a shake change parameter regarding the shake change processing.

The shake change processing changes the state of a shake by reducing the shake occurring in a movie or adding a shake, and this shake change processing is performed on the basis of the shake change parameter set by the parameter setting unit.

In the image processing apparatus according to the present technology described above, it is conceivable to include a user interface processing unit configured to detect operation information regarding shake change, and a parameter setting unit configured to set a shake change parameter regarding the shake change processing on the basis of operation information detected by the user interface processing unit.

That is, a user operation environment for designating the degree of shake is provided.

In the image processing apparatus according to the present technology described above, it is conceivable that the shake change parameter is obtained by converting information of an angle detected by the user interface processing unit into a shake amount.

For example, the user is allowed to perform an operation of designating a shake as an angle of shake, and the user sets a parameter of the shake change processing on the basis of the operation input.

In the image processing apparatus according to the present technology described above, it is conceivable that the shake information processing unit generates the output shake information on the basis of a shake change parameter that designates a processing amount of the shake change processing.

For example, in a case where shake addition is performed to an image, output shake information corresponding to the input shake change parameter is generated.

In the image processing apparatus according to the present technology described above, it is conceivable that the shake information processing unit obtains the output shake information by adjusting image-capturing time shake information on the basis of a shake change parameter that designates a processing amount of the shake change processing.

For example, in a case of partially removing a shake at the time of image capturing in an image, the image-capturing time shake information is adjusted using a shake change parameter.

In the image processing apparatus according to the present technology described above, it is conceivable that the image-capturing time shake information is posture information of the image-capturing apparatus at the time of image capturing of the input image data by an image-capturing apparatus.

The posture information of the image-capturing apparatus can be obtained from information of an angular velocity sensor or an acceleration sensor, for example.

In the image processing apparatus according to the present technology described above, it is conceivable that the shake change unit pastes each frame of the input image data to a celestial sphere model, and performs the shake change processing by rotating each frame using the normalization shake information corresponding to each frame.

For example, rotation processing is performed on the celestial sphere model on the basis of shake information (for example, quaternion) of the image-capturing apparatus obtained from information of the angular velocity sensor or the acceleration sensor.

In the image processing apparatus according to the present technology described above, it is conceivable to include an association unit configured to associate the input image data with the normalization shake information.

Image data and normalization shake information are associated with each other so that what kind of shake change has been performed as the shake change processing can be grasped.

In an image processing method according to the present technology, an image processing apparatus performs shake information processing of outputting output shake information for input image data constituting a movie, shake information normalization processing of obtaining normalization shake information by normalizing the output shake information on the basis of angle of view information, and shake change processing of changing a shake state of the input image data using the normalization shake information.

This prevents the degree of shake addition or shake remaining on an image from greatly varying depending on the angle of view.

A program according to the present technology is a program that causes an information processing apparatus to execute processing corresponding to such an image processing method.

This enables image processing of the present disclosure to be executed by various information processing apparatuses.

BRIEF DESCRIPTION OF DRAWINGS

FIG. 2 is an explanatory diagram of information transmitted between pieces of equipment of the embodiment.

FIGS. 12A, 12B, and 12C are explanatory diagrams of content of an image file and metadata of the embodiment.

FIG. 14 is an explanatory diagram of image processing of the embodiment.

FIGS. 21A and 21B are explanatory diagrams of rotation of an output coordinate plane and perspective projection of the embodiment.

FIG. 23 is an explanatory diagram of content of metadata to be transferred of the embodiment.

MODE FOR CARRYING OUT THE INVENTION

Figure 1A:
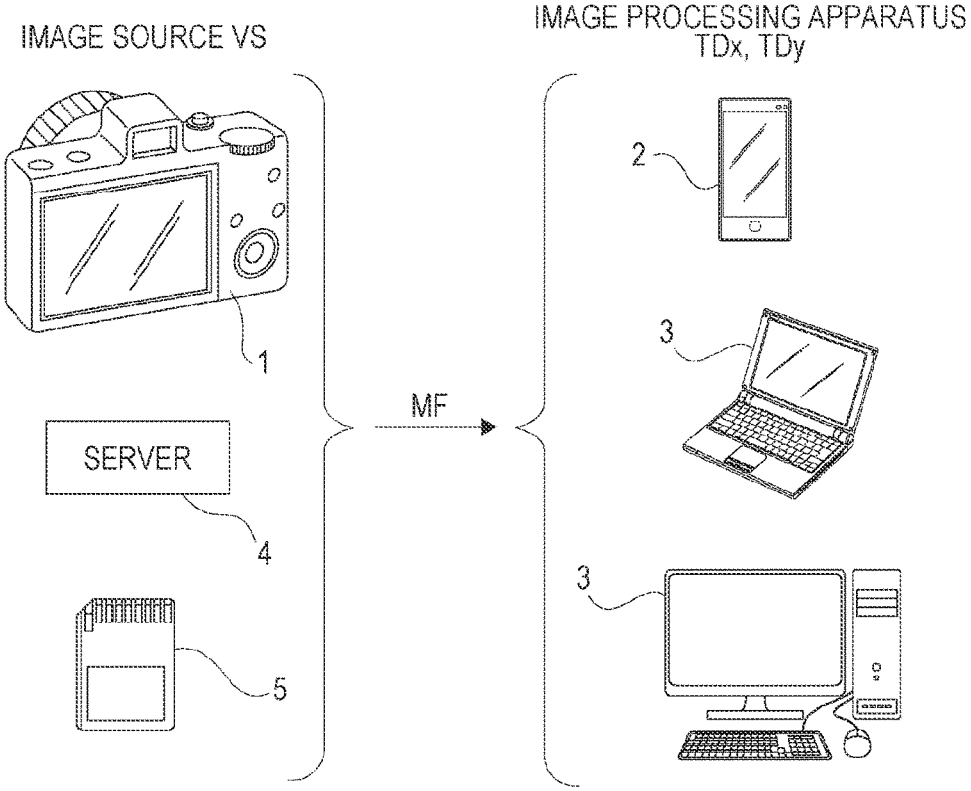
FIGS. 1A and 1B are explanatory diagrams of equipment used in an embodiment of the present technology.

An embodiment will be described below in the following order.

<1. Configuration of equipment applicable as image processing apparatus>
<2. Apparatus configuration and processing function>
<3. Shake change and normalization of shake information>
<4. Image file and metadata>
<5. Processing example>
<6. Summary and modifications>

Prior to description of the embodiment, some terms used in the description will be described.

"Shake" refers to an interframe shake of an image constituting a movie. It is assumed to widely refer to vibration components (interframe shake of image) occurring between frames, such as a shake caused by camera shake or the like in an image captured by a so-called image-capturing apparatus, a shake intentionally added by image processing, and the like.

"Shake change (interframe shake modification)" refers to changing a state of a shake in an image, such as reduction of a shake occurring in the image or addition of a shake to the image.

It is assumed that this "shake change" includes the following "shake removal (interframe shake reduction)" and "shake addition (interframe shake addition)".

"Shake removal" refers to elimination (shake total removal) or reduction (shale partial removal) of a shake occurring in an image due to camera shake or the like. That is, it refers to adjusting to reduce a shake on the basis of shake information at the time of image capturing. So-called image stabilization performed in the image-capturing apparatus is to perform shake removal.

In the present embodiment, an example of performing processing of removing a part of the shake component mainly as "shake partial removal" will be described, and this is to perform shake change an image so that the shake remains.

"Shake addition" refers to applying a shake to an image. It includes applying a shake to a shake-free image, and applying a shake to an image with shake so as to further increase the shake.

The above "shake partial removal" and "shake addition" are processing for obtaining an image with shake as a result, and accordingly can be deemed to be processing of shake addition production.

Note that, as an example of the purpose of shake production, it is assumed to intentionally shake an image in order to give punch to the scene of a movie.

"Image-capturing time shake information" is information regarding a shake at the time of capturing by the image-capturing apparatus, and corresponds to detection information of motion of the image-capturing apparatus, information that can be calculated from the detection information, posture information indicating the posture of the image-capturing apparatus, shift and rotation information as motion of the image-capturing apparatus, and the like.

In the embodiment, specific examples of "image-capturing time shake information" include quaternion (QD) and IMU data, but there are also shift and rotation information, for example, and there is no particular limitation.

<1. Configuration of Equipment Applicable as Image Processing Apparatus>

In the embodiment below, an example in which the image processing apparatus according to the present disclosure is mainly achieved by an information processing apparatus such as a smartphone or a personal computer will be described, but the image processing apparatus can be achieved in various equipment. First, equipment to which the technology of the present disclosure can be applied will be described.

FIG. 1A illustrates an example of an image source VS and an image processing apparatus (TDx, TDy) that acquires an image file MF from the image source VS.

Note that the image processing apparatus TDx is assumed to be equipment that primarily performs shake change processing on image data acquired from the image source VS.

On the other hand, the image processing apparatus TDy is assumed to be equipment that secondarily performs shake change processing on image data already subjected to shake change processing by another image processing apparatus.

As the image source VS, an image-capturing apparatus 1, a server 4, a recording medium 5, and the like are assumed.

As the image processing apparatuses TDx and TDy, a mobile terminal 2 such as a smartphone, a personal computer 3, or the like is assumed. Although not illustrated, various other equipment such as an image editing dedicated apparatus, a cloud server, a television apparatus, and a video recording and reproducing apparatus, are assumed as the image processing apparatuses TDx and TDy. These equipment can function as any of the image processing apparatuses TDx and TDy.

The image-capturing apparatus 1 as the image source VS is a digital camera or the like capable of capturing a movie, and transfers the image file MF obtained by capturing a movie to the mobile terminal 2, the personal computer 3, or the like via wired communication or wireless communication.

The server 4 may be any of a local server, a network server, a cloud server, and the like, but refers to an apparatus that can provide the image file MF captured by the image-capturing apparatus 1. It is conceivable that the server 4 transfers the image file MF to the mobile terminal 2, the personal computer 3, or the like via some transmission path.

The recording medium 5 may be any of a solid-state memory such as a memory card, a disk-like recording medium such as an optical disk, a tape-like recording medium such as a magnetic tape, and the like, but refers to a removable recording medium on which the image file MF captured by the image-capturing apparatus 1 is recorded. It is conceivable that the image file MF read from the recording medium 5 is read by the mobile terminal 2, the personal computer 3, or the like.

The mobile terminal 2, the personal computer 3, and the like as the image processing apparatuses TDx and TDy can perform image processing on the image file MF acquired from the image source VS described above. The image processing mentioned here includes shake change processing (shake addition or shake partial removal).

Shake change processing is performed, for example, by performing pasting processing to a celestial sphere model for each frame of the image data constituting the movie, and then rotating by using posture information corresponding to the frame.

Note that a certain mobile terminal 2 or personal computer 3 sometimes serves as the image source VS for another mobile terminal 2 or personal computer 3 functioning as the image processing apparatuses TDx and TDy.

Figure 1B:
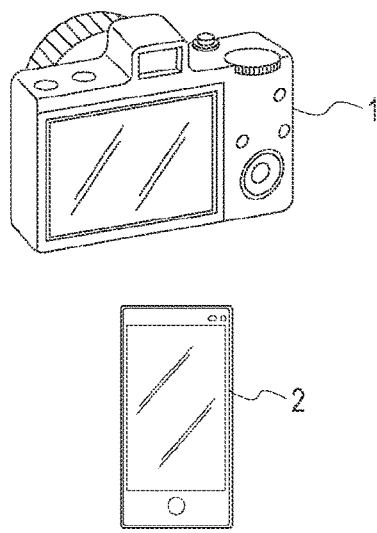

FIG. 1B illustrates the image-capturing apparatus 1 and the mobile terminal 2 as one piece of equipment that can function as both the image source VS and the image processing apparatus TDx.

For example, a microcomputer or the like inside the image-capturing apparatus 1 performs shake change processing.

That is, the image-capturing apparatus 1 is assumed to be able to perform image output as an image processing result applied with shake partial removal or shake addition by performing shake change processing on the image file MF generated by image capturing.

The mobile terminal 2 can similarly be the image source VS by including an image-capturing function, and therefore it is possible to perform image output as an image processing result applied with shake partial removal or shake addition by performing the shake change processing on the image file MF generated by image capturing.

Of course, not limited to the image-capturing apparatus 1 and the mobile terminal 2, there are various other equipment that can serve as an image source and an image processing apparatus.

As described above, there are various apparatuses that function as the image processing apparatuses TDx and TDy of the embodiment and the image sources VS, but in the following description, the image source VS such as the image-capturing apparatus 1, the image processing apparatus TDx such as the mobile terminal 2, and the other image processing apparatuses TDy will be described as separate pieces of equipment.

FIG. 2 illustrates a state of information transmission in the image source VS, the image processing apparatus TDx, and the image processing apparatus TDy.

Image data VD1 and metadata MTD1 are transmitted from the image source VS to the image processing apparatus TDx via wired communication, wireless communication, or a recording medium.

As will be described later, the image data VD1 and the metadata MTD1 are information transmitted as the image file MF, for example.

The metadata MTD1 may include a coordinate transformation parameter HP as information of shake removal at the time of image capturing performed as image stabilization or the like, for example.

The image processing apparatus TDx can perform various types of processing in response to the image data VD1, the metadata MTD1, and the coordinate transformation parameter HP.

For example, the image processing apparatus TDx can perform shake change processing on the image data VD1 using image-capturing time shake information included in the metadata MTD1.

Furthermore, for example, the image processing apparatus TDx can also cancel the shake removal applied to the image data VD1 at the time of image capturing by using the coordinate transformation parameter HP included in the metadata MTD1.

In a case where the image processing apparatus TDx has performed shake change processing, the image processing apparatus TDx can perform processing of associating the image data, the image-capturing time shake information, and shake change information SMI and normalization shake information SCI with which the processing amount of the shake change processing can be specified.

The shake change information SMI is information of the shake change processing of the image data, and is only required to be information with which the processing amount of the shake change processing can be specified.

In the embodiment, specific examples of "shake change information" include a shake change parameter (PRM) and a shake change quaternion (eQD), but are not limited to them.

The normalization shake information SCI is shake information having been normalized. Although a normalized quaternion (nQD) will be described later as an example, in the present embodiment, shake change processing is performed on the basis of shake information having been normalized.

Then, the image processing apparatus TDx can transmit the associated image data, the image-capturing time shake information, the shake change information SMI, and the normalization shake information SCI to the image processing apparatus TDy collectively or separately via wired communication, wireless communication, or a recording medium.

Alternatively, at least the image data and the normalization shake information SCI are transmitted in association with each other.

Here, the term "associate" means that, for example, when one piece of information (data, command, program, and the like) is processed, the other piece of information can be used (linked). That is, pieces of information associated with each other may be put together as one file or the like, or may be individual pieces of information. For example, information B associated with information A may be transmitted on a transmission path different from the transmission path for the information A. Furthermore, for example, the information B associated with the information A may be recorded in a recording medium different from the recording medium (or another recording area of the same recording medium) for the information A. Note that this "association" may be a part of information instead of the entire information. For example, an image and information corresponding to the image may be associated with each other in a discretionary unit such as a plurality of frames, one frame, or a part in a frame.

More specifically, "associate" includes actions such as giving a same ID (identification information) to a plurality of pieces of information, recording a plurality of pieces of information into a same recording medium, storing a plurality of pieces of information into a same folder, storing a plurality of pieces of information into a same file (giving one to the other as metadata), embedding a plurality of pieces of information into a same stream, and embedding meta into an image such as a digital watermark.

FIG. 2 illustrates image data transmitted from the image processing apparatus TDx to the image processing apparatus TDy as image data VD2. Various examples of the image data VD2 include an image in which shake removal performed by the image-capturing apparatus 1 is canceled, an image in which shake change is performed by the image processing apparatus TDx, and an image before shake change processing is performed by the image processing apparatus TDx.

Furthermore, FIG. 2 illustrates metadata MTD2 transmitted from the image processing apparatus TDx to the image processing apparatus TDy. The metadata MTD2 is the information same as or information partially different from the metadata MTD1. However, the metadata MTD2 includes image-capturing time shake information.

Therefore, the image processing apparatus TDy can acquire, for example, at least the image data VD2, image-capturing time shake information included in the metadata MTD2, the normalization shake information SCI, and the shake change information SMI in an associated state.

Note that it is also conceivable a data form in which the normalization shake information SCI and the shake change information SMI are also included in the metadata MTD2.

In the present embodiment, shake change processing mainly in the image processing apparatus TDx will be described, but information transmission as described above can be assumed for the image processing apparatus TDx.

<2. Apparatus Configuration and Processing Function>

First, a configuration example of the image-capturing apparatus 1 serving as the image source VS will be described with reference to FIG. 3.

Note that, in a case where it is assumed that the image file MF captured by the mobile terminal 2 is subjected to image processing by the mobile terminal 2 as described with reference to FIG. 1B, the mobile terminal 2 only needs to include a configuration equivalent to the image-capturing apparatus 1 below regarding the image-capturing function.

Furthermore, the image-capturing apparatus 1 performs processing of reducing shake in an image due to motion of the image-capturing apparatus at the time of image capturing, which is so-called image stabilization, and this is "shake removal" performed by the image-capturing apparatus. On the other hand, "shake addition" and "shake partial removal" performed by the image processing apparatuses TDx and TDy are separate processing independent of "shake removal" performed at the time of image capturing by the image-capturing apparatus 1.

Figure 3:
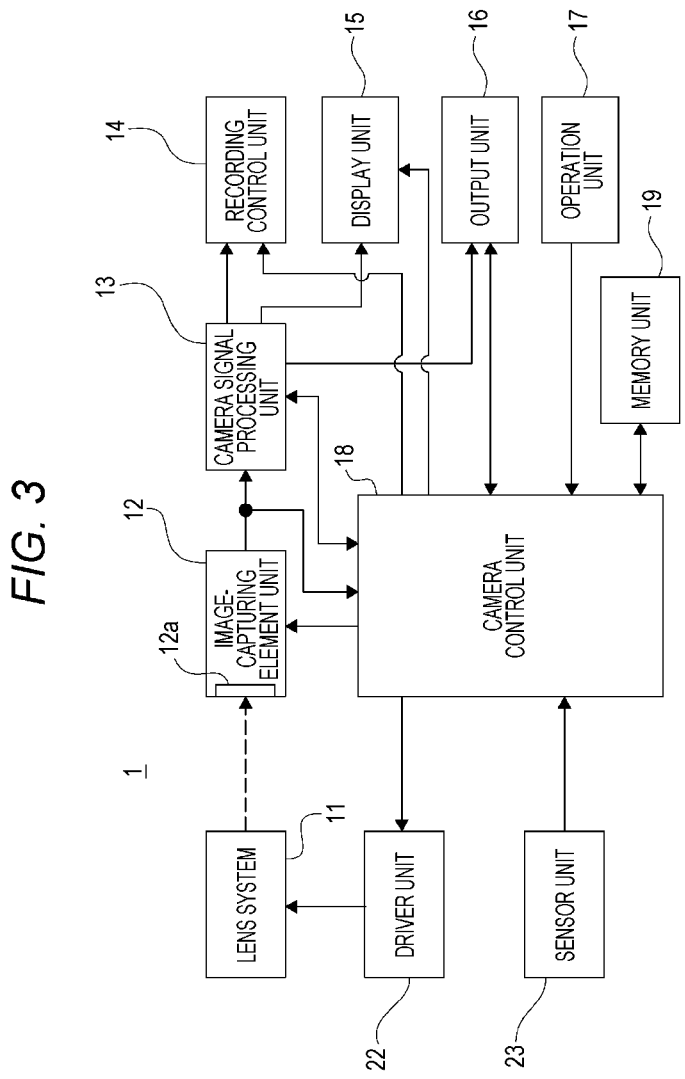
FIG. 3 is a block diagram of an image-capturing apparatus of the embodiment.

As illustrated in FIG. 3, the image-capturing apparatus 1 includes, for example, a lens system 11, an image-capturing element unit 12, a camera signal processing unit 13, a recording control unit 14, a display unit 15, an output unit 16, an operation unit 17, a camera control unit 18, a memory unit 19, a driver unit 22, and a sensor unit 23.

The lens system 11 includes lenses such as a cover lens, a zoom lens, and a focus lens, and a diaphragm mechanism. Light (incident light) from a subject is guided by this lens system 11 and collected on the image-capturing element unit 12.

Note that, although not illustrated, there is a case where the lens system 11 is provided with an optical image stabilization mechanism that corrects interframe shake and blur of an image due to camera shake or the like.

The image-capturing element unit 12 includes, for example, an image sensor 12a (image-capturing element) of a complementary metal oxide semiconductor (CMOS) type, a charge coupled device (CCD) type, or the like.

This image-capturing element unit 12 executes, for example, correlated double sampling (CDS) processing, automatic gain control (AGC) processing, and the like for an electrical signal obtained by photoelectrically converting light received by the image sensor 12a, and further performs analog/digital (A/D) conversion processing. Then, an image-capturing signal as digital data is output to the camera signal processing unit 13 and the camera control unit 18 in the subsequent stage.

Note that, as an optical image stabilization mechanism not illustrated, there are a case of a mechanism that corrects a shake in an image by moving not the lens system 11 side but the image sensor 12a side, a case of a balanced optical image stabilization mechanism using a gimbal, and the like, and any method may be used.

In the optical image stabilization mechanism, blur in a frame is also corrected as described later in addition to a shake.

The camera signal processing unit 13 is configured as an image processing processor by, for example, a digital signal processor (DSP) or the like. This camera signal processing unit 13 performs various types of signal processing on a digital signal (captured image signal) from the image-capturing element unit 12. For example, as a camera process, the camera signal processing unit 13 performs preprocessing, synchronization processing, YC generation processing, resolution conversion processing, codec processing, and the like.

Furthermore, the camera signal processing unit 13 also performs various types of correction processing. However, there are cases where image stabilization is performed in the image-capturing apparatus 1 or not performed.

The preprocessing includes clamp processing of clamping the black levels of R, G, and B to a predetermined level, correction processing among the color channels of R, G, and B, and the like for a captured image signal from the image-capturing element unit 12.

The synchronization processing includes color separation processing for image data for each pixel to have all the R, G, and B color components. For example, in a case of an image-capturing element using a Bayer array color filter, demosaic processing is performed as color separation processing.

In the YC generation processing, a luminance (Y) signal and a color (C) signal are generated (separated) from the R, G, and B image data.

In the resolution conversion processing, the resolution conversion processing is executed on image data subjected to various types of signal processing.

Figure 4:
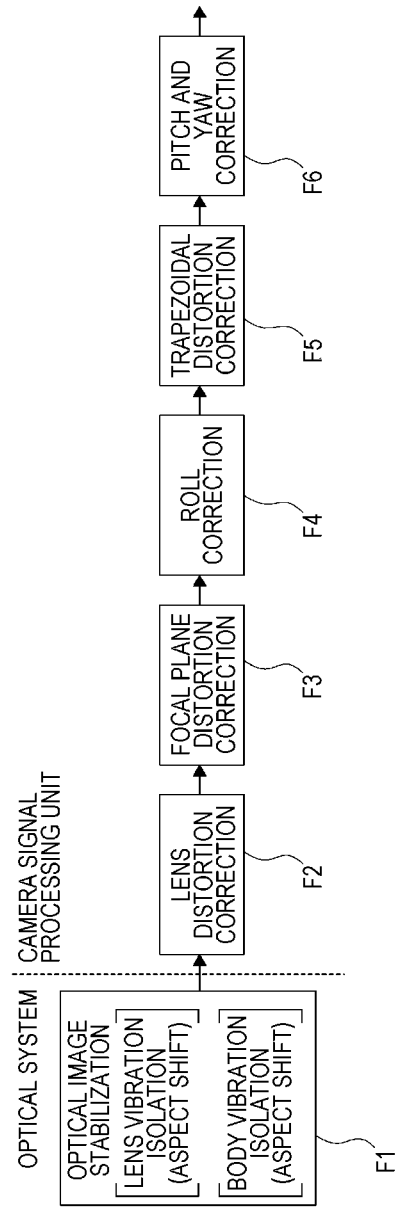
FIG. 4 is an explanatory diagram of shake removal processing of an image in the image-capturing apparatus of the embodiment.

FIG. 4 presents an example of various types of correction processing (internal correction of the image-capturing apparatus 1) performed by the camera signal processing unit 13. FIG. 4 exemplifies the correction processing performed by the camera signal processing unit 13 together with the optical image stabilization performed by the lens system 11 in the execution order.

In the optical image stabilization as processing F1, in-lens image stabilization by shift in the yaw direction and the pitch direction of the lens system 11 and in-body image stabilization by shift in the yaw direction and the pitch direction of the image sensor 12a are performed, so that an image of the subject is formed on the image sensor 12a in a state where the influence of camera shake is physically canceled.

There is a case where only one of the in-lens image stabilization and the in-body image stabilization is used, and there is a case where both of them are used. In the case where both the in-lens image stabilization and the in-body image stabilization are used, it is conceivable that shift in the yaw direction and the pitch direction is not performed in the in-body image stabilization.

Furthermore, there is a case where neither the in-lens image stabilization nor the in-body image stabilization is adopted, and only electrical image stabilization or only optical image stabilization is performed for camera shake.

In the camera signal processing unit 13, the processing from processing F2 to processing F7 is performed by spatial coordinate transformation for each pixel.

In the processing F2, lens distortion correction is performed.

In the processing F3, focal plane distortion correction as one element of the electrical image stabilization is performed. Note that this is to correct distortion in a case where reading by the rolling shutter method is performed by the CMOS image sensor 12a, for example.

In the processing F4, roll correction is performed. That is, correction of the roll component as one element of the electrical image stabilization is performed.

In the processing F5, trapezoidal distortion correction is performed for the trapezoidal distortion amount caused by electrical image stabilization. The trapezoidal distortion amount caused by the electrical image stabilization is perspective distortion caused by clipping a place away from the center of the image.

In the processing F6, shift and clipping in the pitch direction and the yaw direction are performed as one element of the electrical image stabilization.

For example, the image stabilization, the lens distortion correction, and the trapezoidal distortion correction are performed by the above procedure.

Note that it is not essential to perform all the processing described here, and the order of the processing may be appropriately switched.

In codec processing in the camera signal processing unit 13 of FIG. 3, for example, encoding processing for recording or communication and file generation are performed on the image data subjected to the above-described various types of processing. For example, the image file MF is generated as an MP4 format or the like used for recording movies and audio conforming to MPEG-4. Furthermore, it is also conceivable to generate a file in a format such as Joint Photographic Experts Group (JPEG), Tagged Image File Format (TIFF), or Graphics Interchange Format (GIF) as a still image file.

Note that the camera signal processing unit 13 also generates metadata to be added to the image file MF by using information or the like from the camera control unit 18.

Furthermore, although an audio processing system is not illustrated in FIG. 3, an audio recording system and an audio processing system are actually included, and the image file MF may include audio data together with image data as a movie.

The recording control unit 14 performs recording and reproduction on a recording medium by a nonvolatile memory, for example. For example, the recording control unit 14 performs processing of recording the image file MF, a thumbnail image, and the like of movie data, still image data, and the like on a recording medium.

Actual forms of the recording control unit 14 can be conceived in various ways. For example, the recording control unit 14 may be configured as a flash memory built in the image-capturing apparatus 1 and its write/read circuit, or may be in a form of a card recording and reproduction unit configured to perform recording and reproduction access to a recording medium that can be pasted to and detached from the image-capturing apparatus 1, for example, a memory card (portable flash memory or the like). Furthermore, as a form built in the image-capturing apparatus 1, there is a case where the recording control unit 14 is achieved as a hard disk drive (HDD) or the like.

The display unit 15 is a display unit configured to perform various types of display for an image-capturing person, and is, for example, a display panel or a viewfinder by a display device such as a liquid crystal display (LCD) or an organic electro-luminescence (EL) display disposed in a housing of the image-capturing apparatus 1.

The display unit 15 executes various types of display onto a display screen on the basis of an instruction from the camera control unit 18.

For example, the display unit 15 displays a reproduction image of the image data read from the recording medium in the recording control unit 14.

Furthermore, there is a case where image data of a captured image whose resolution has been converted for display by the camera signal processing unit 13 is supplied to the display unit 15, and the display unit 15 performs display on the basis of the image data of the captured image in response to an instruction from the camera control unit 18. Due to this, a so-called through-the-lens image (subject monitoring image), which is a captured image during composition checking, is displayed.

Furthermore, on the basis of an instruction from the camera control unit 18, the display unit 15 executes various operation menus, icons, messages, and the like, that is, display as a graphical user interface (GUI) onto the screen.

The output unit 16 performs data communication and network communication with external equipment in a wired or wireless manner.

The output unit 16 transmits and outputs captured image data (still image file or movie file) to, for example, an external display apparatus, a recording apparatus, a reproduction apparatus, or the like.

Furthermore, as a network communication unit, the output unit 16 may perform communication via various networks such as the Internet, a home network, and a local area network (LAN), and transmit and receive various data to and from a server, a terminal, or the like on the network.

The operation unit 17 collectively indicates input devices for the user to perform various types of operation input. Specifically, the operation unit 17 indicates various operators (keys, dials, touchscreens, touch pads, and the like) provided in the housing of the image-capturing apparatus 1.

A user's operation is detected by the operation unit 17, and a signal corresponding to the input operation is transmitted to the camera control unit 18.

The camera control unit 18 includes a microcomputer (arithmetic processing apparatus) including a central processing unit (CPU).

The memory unit 19 stores information and the like used for processing by the camera control unit 18. The memory unit 19 that is illustrated comprehensively presents, for example, a read only memory (ROM), a random access memory (RAM), a flash memory, and the like.

The memory unit 19 may be a memory region built in a microcomputer chip as the camera control unit 18 or may be configured by a separate memory chip.

By executing a program stored in the ROM, the flash memory, or the like of the memory unit 19, the camera control unit 18 controls the entire image-capturing apparatus 1.

For example, the camera control unit 18 controls the operation of each necessary unit regarding control of the shutter speed of the image-capturing element unit 12, an instruction of various types of signal processing in the camera signal processing unit 13, an image capturing operation and a recording operation according to the user's operation, a reproduction operation of a recorded image file, operations of the lens system 11 such as zooming, focusing, and diaphragm adjustment in a lens barrel, the user interface operation, and the like.

The RAM in the memory unit 19 is used for temporary storage of data, programs, and the like as a work area at the time of various data processing of the CPU of the camera control unit 18.

The ROM and the flash memory (nonvolatile memory) in the memory unit 19 are used for storing an operating system (OS) for the CPU to control each unit, content files such as image files, application programs for various operations, firmware, and the like.

The driver unit 22 is provided with, for example, a motor driver for a zoom lens drive motor, a motor driver for a focus lens drive motor, a motor driver for a motor of a diaphragm mechanism, and the like.

These motor drivers apply a drive current to a corresponding driver in response to an instruction from the camera control unit 18, and cause the drivers to execute movement of the focus lens and the zoom lens, opening and closing of a diaphragm blade of the diaphragm mechanism, and the like.

The sensor unit 23 comprehensively indicates various sensors mounted on the image-capturing apparatus.

The sensor unit 23 is mounted with, for example, an inertial measurement unit (IMU) in which an angular velocity (gyro) sensor of three axes of pitch, yaw, and roll, for example, can detect an angular velocity, and an acceleration sensor can detect an acceleration.

Note that the sensor unit 23 only needs to include a sensor capable of detecting camera shake at the time of image capturing, and does not need to include both the gyro sensor and the acceleration sensor.

Furthermore, as the sensor unit 23, a position information sensor, an illuminance sensor, or the like may be mounted.

For example, the image file MF as a movie captured and generated by the image-capturing apparatus 1 described above can be transferred to the image processing apparatuses TDx and TDy such as the mobile terminal 2 and subjected to image processing.

Figure 5:
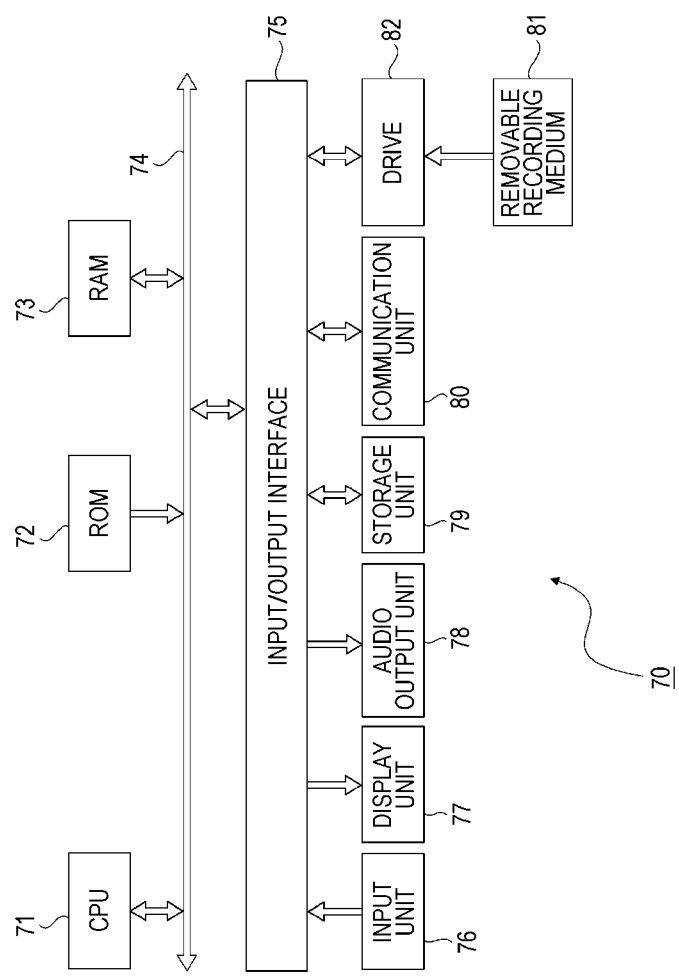
FIG. 5 is a block diagram of an information processing apparatus of the embodiment.

The mobile terminal 2 and the personal computer 3 serving as the image processing apparatuses TDx and TDy can be achieved as an information processing apparatus including the configuration illustrated in FIG. 5, for example. Note that the server 4 can be similarly achieved by the information processing apparatus having the configuration of FIG. 5.

In FIG. 5, a CPU 71 of an information processing apparatus 70 executes various types of processing according to a program stored in a ROM 72 or a program loaded from a storage unit 79 into a RAM 73. The RAM 73 also appropriately stores data and the like necessary for the CPU 71 to execute various types of processing.

The CPU 71, the ROM 72, and the RAM 73 are connected to one another via a bus 74. An input/output interface 75 is also connected to this bus 74.

An input unit 76 including an operator and an operation device is connected to the input/output interface 75.

For example, as the input unit 76, various operators and operation devices such as a keyboard, a mouse, a key, a dial, a touchscreen, a touch pad, and a remote controller are assumed.

A user's operation is detected by the input unit 76, and a signal corresponding to the input operation is interpreted by the CPU 71.

Furthermore, a display unit 77 including an LCD or an organic EL panel and an audio output unit 78 including a speaker are connected to the input/output interface 75 integrally or separately.

The display unit 77 is a display unit configured to perform various types of display, and includes, for example, a display device provided in the housing of the information processing apparatus 70, a separate display device connected to the information processing apparatus 70, or the like.

The display unit 77 executes display of an image for various types of image processing, a movie of the processing target, and the like onto the display screen on the basis of an instruction from the CPU 71. Furthermore, on the basis of an instruction from the CPU 71, the display unit 77 displays various operation menus, icons, messages, and the like, that is, display as a graphical user interface (GUI).

In some cases, the storage unit 79 including a hard disk, a solid-state memory, or the like, and a communication unit 80 including a modem or the like are connected to the input/output interface 75.

The communication unit 80 performs communication processing via a transmission path such as the Internet, wired/wireless communication with various types of equipment, bus communication, and the like.

A drive 82 is also connected to the input/output interface 75 as necessary, and a removable recording medium 81 such as a magnetic disk, an optical disk, a magneto-optical disk, or a semiconductor memory is appropriately mounted.

A data file such as the image file MF, various computer programs, and the like can be read from the removable recording medium 81 by the drive 82. The data file having been read is stored in the storage unit 79, and images and audio included in the data file are output by the display unit 77 and the audio output unit 78. Furthermore, the computer program and the like read from the removable recording medium 81 are installed in the storage unit 79 as necessary.

In this information processing apparatus 70, software for image processing as the image processing apparatus of the present disclosure, for example, can be installed via network communication by the communication unit 80 or the removable recording medium 81. Alternatively, the software may be stored in advance in the ROM 72, the storage unit 79, or the like.

Figure 6:
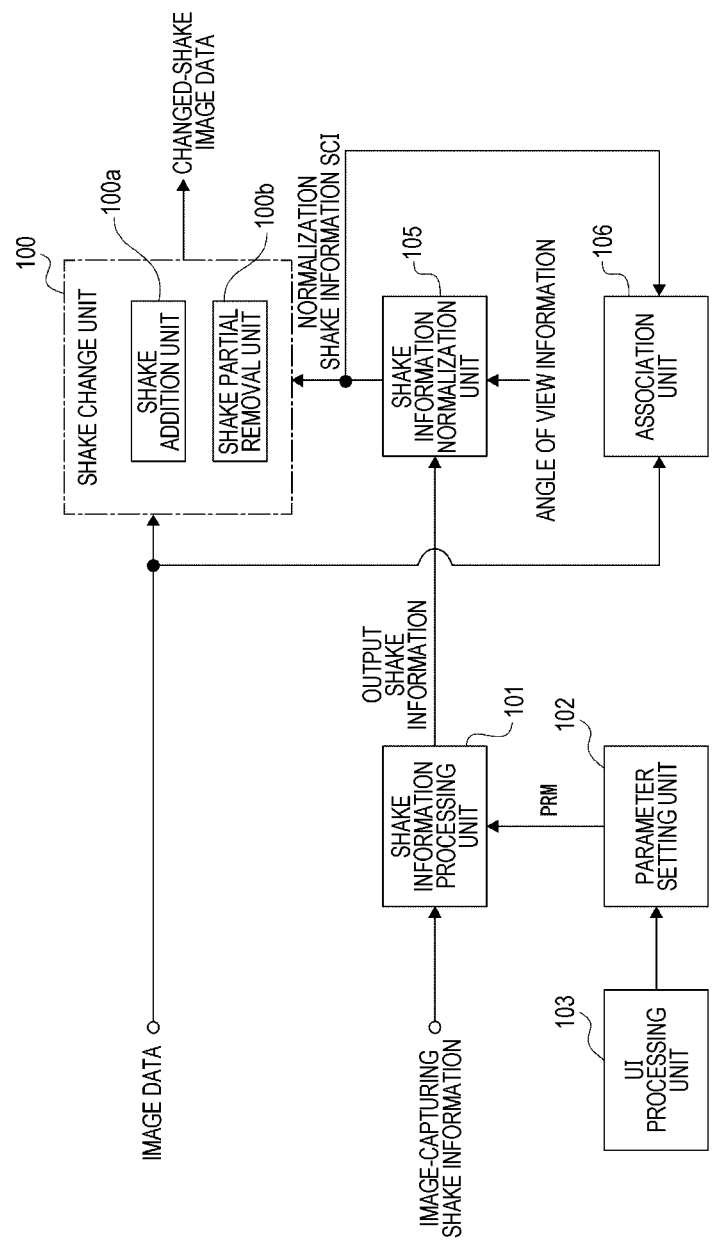
FIG. 6 is an explanatory diagram of a functional configuration as an image processing apparatus of the embodiment.

For example, the functional configuration as in FIG. 6 is constructed in the CPU 71 of the information processing apparatus 70 by such software (application program).

FIG. 6 illustrates a function provided as the information processing apparatus 70 functioning as the image processing apparatus TDx. That is, the information processing apparatus 70 (CPU 71) includes functions as a shake change unit 100, a shake information processing unit 101, a parameter setting unit 102, a user interface processing unit 103, a shake information normalization unit 105, and an association unit 106.

Note that "user interface" is also referred to as "UI", and the user interface processing unit 103 is hereinafter also referred to as "UI processing unit 103".

The shake information processing unit 101 performs processing of outputting output shake information for input image data constituting a movie. For example, the shake information processing unit 101 adjusts the image-capturing time shake information to obtain and output output shake information for shake partial removal or shake addition. Alternatively, the shake information processing unit 101 generates and outputs, as output shake information, shake information for shake partial removal or shake addition according to the shake change parameter PRM having been input.

The shake change parameter PRM is a processing parameter generated by a user operation or automatic control.

The shake information normalization unit 105 performs processing of normalizing the output shake information output through adjustment processing and generation processing in the shake information processing unit 101 on the basis of the angle of view information. Then, the normalization shake information SCI is output to the shake change unit 100. The normalization processing will be described later.

The shake change unit 100 performs shake change processing of changing a shake state of the image data using the normalization shake information SCI.

The shake change unit 100 includes a function as a shake addition unit 100a, and performs processing of adding a shake using the normalization shake information SCI in particular.

Furthermore, the shake change unit 100 has a function as a shake partial removal unit 100b, and performs processing of removing a part of the shake using the normalization shake information SCI in particular.

Note that the shake addition unit 100a and the shake partial removal unit 100b are not necessarily formed by different algorithms, and it may be understood that shake addition or shake partial removal is performed as a result of shake change processing using the normalization shake information SCI. The reason why the shake addition unit 100a and the shake partial removal unit 100b are illustrated in the drawing is to indicate that shake addition or shake partial removal is performed as shake change processing.

The shake change unit 100 outputs image data with the shake having been changed for which shake addition or shake partial removal has been performed.

The UI processing unit 103 is a function of processing of presenting an operator related to shake change to the user and acquiring operation information by the operator.

For example, the UI processing unit 103 performs processing of causing the display unit 77 to display, as a UI image, an image indicating information regarding an operator and an image. Furthermore, the UI processing unit 103 detects a user's operation with the input unit 76. For example, a touch operation or the like on a UI image is detected.

The parameter setting unit 102 is a function of setting a parameter (shake change parameter PRM) for shake change processing on the basis of the operation information acquired by the UI processing unit 103. That is, the user operation content detected by the UI processing unit 103 is converted into the shake change parameter PRM and supplied to the shake information processing unit 101, so that the shake change processing according to the user's operation is performed on the image data.

Note that the parameter setting unit 102 does not necessarily need to perform parameter setting according to a user operation. For example, parameter setting to add a fixed shake pattern may be performed. Furthermore, for example, the shake change parameter PRM may be automatically set according to the image content. For example, as archive data of shake patterns, information of shake patterns corresponding to "slowly walking person", "walking person", "running person", and the like, shake patterns corresponding to "rabbit", "cat", "horse", and the like, and shake patterns corresponding to automobiles, ships, airplanes, and the like can be acquired from a database. The shake information may be selected according to the image content, and the shake change parameter PRM according to the shake pattern may be set.

Of course, it is also conceivable that the user selects a shake pattern and sets the shake change parameter PRM according to the selection.

Note that "shake information" mentioned in the present disclosure can be regarded as any of Information representing an amount of shake present in an image Information representing an amount of shake added to an image.

When the shake change processing is performed toward suppressing the shake amount indicated by "information representing an amount of shake present in an image", shake removal is performed. In this case, if the shake change processing is performed toward adjusting the shake amount to be small and suppressing the shake amount, shake partial removal is performed.

On the other hand, also when shake is removed in accordance with "information representing an amount of shake present in an image", and then a shake is added in accordance with shake information in which "information representing an amount of shake present in an image" has been adjusted, shake partial removal is performed as a result.

Furthermore, when shake change is performed so as to add a shake to a shake-free image, an image from which a shake has been removed, or an image with a shake according to "information representing an amount of shake added to an image", shake addition is performed.

That is, the specific arithmetic processing of shake change differs depending on which of the above "shake information" is, but the shake change of the present embodiment is possible in either case.

The association unit 106 is a function of performing processing of associating image data with the normalization shake information SCI.

For example, the association unit 106 may store the image data and the normalization shake information SCI in association with each other. Alternatively, the association unit 106 may generate and store information for associating the image data and the normalization shake information SCI with each other.

In this case, the image data is image data before the shake change processing in the shake change unit 100 is performed.

The association unit 106 may further associate the normalization shake information SCI with the shake change information SMI (see FIG. 2) with which the processing amount of the shake change processing can be specified and the image-capturing time shake information. The shake change information SMI is a shake change parameter PRM input for shake change for the image data, for example.

Figure 7:
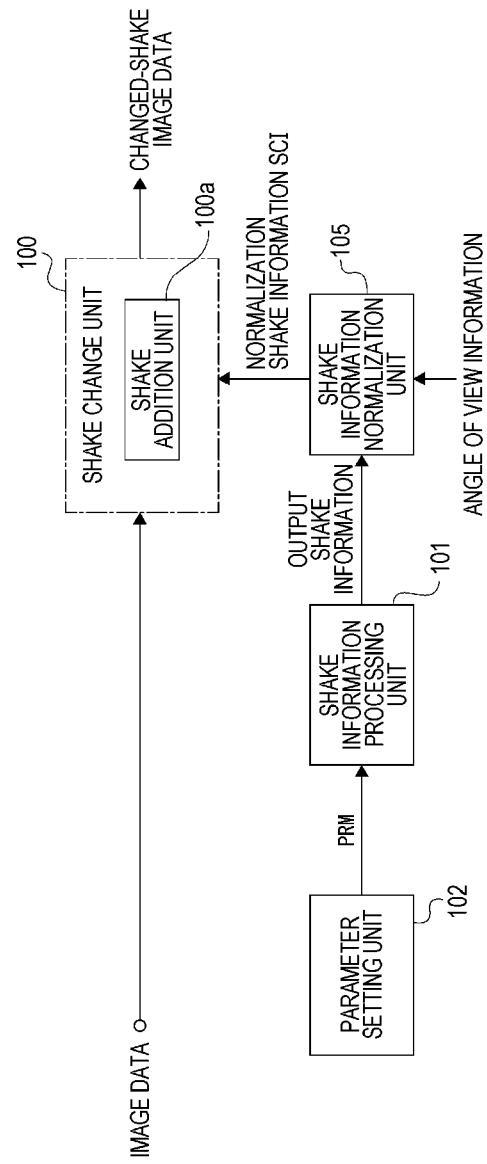
FIG. 7 is an explanatory diagram of another example of the functional configuration as the image processing apparatus of the embodiment.

FIG. 7 illustrates a functional configuration where FIG. 6 is modified.

In the case of FIG. 7, the shake change unit 100 includes only the shake addition unit 100a.

The shake information processing unit 101 generates output shake information on the basis of the shake change parameter PRM from the parameter setting unit 102, and the output shake information is normalized by the shake information normalization unit 105 and sent to the shake change unit 100.

The shake change unit 100 performs shake addition on the basis of the normalization shake information SCI.

Figure 8:
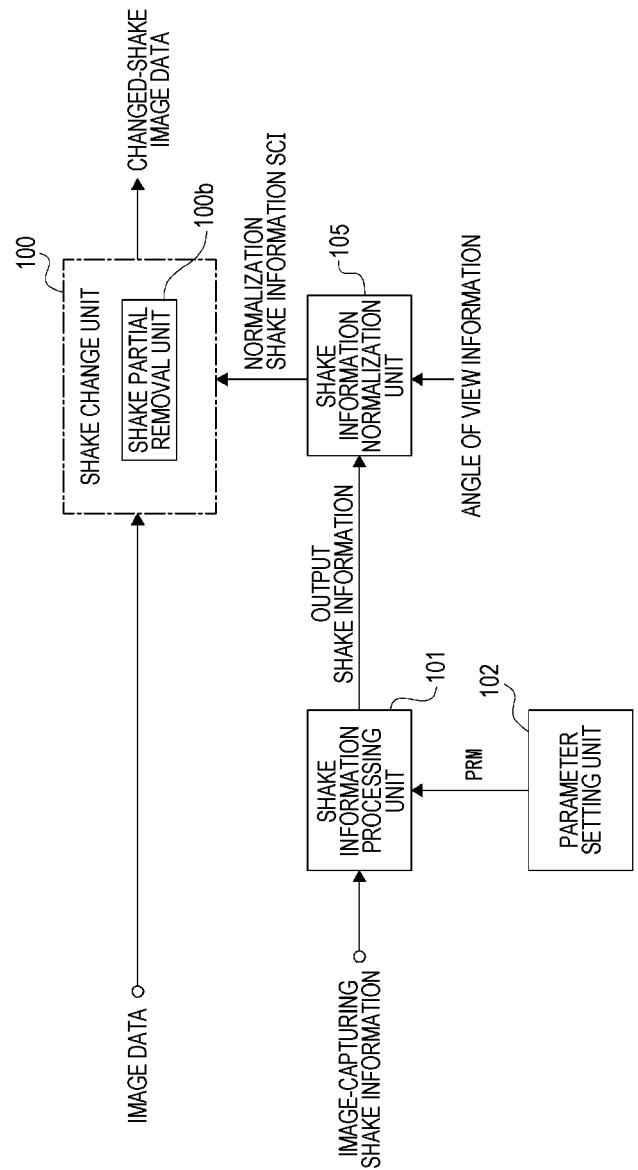
FIG. 8 is an explanatory diagram of still another example of the functional configuration as the image processing apparatus of the embodiment.

FIG. 8 also illustrates a functional configuration where FIG. 6 is modified.

In the case of FIG. 8, the shake change unit 100 includes only the shake partial removal unit 100b.

On the basis of the shake change parameter PRM from the parameter setting unit 102, the shake information processing unit 101 outputs output shake information in which the image-capturing time shake information is adjusted, and the output shake information is normalized by the shake information normalization unit 105 and sent to the shake change unit 100.

The shake change unit 100 performs shake partial removal on the basis of the normalization shake information SCI.

Although FIGS. 7 and 8 above are more simplified functional configuration examples, other configuration examples are conceivable. For example, in the configuration of FIG. 8, the shake change unit 100 may include only the shake addition unit 100a. For example, on the basis of the shake change parameter PRM from the parameter setting unit 102, the shake information processing unit 101 outputs shake information in which the image-capturing time shake information is adjusted, and the shake information is normalized by the shake information normalization unit 105 and sent to the shake change unit 100. The shake change unit 100 performs shake addition on the basis of the normalization shake information SCI. That is, it is an example of performing processing of further increasing the shake of the original image data.

Note that, although the functional configuration as the image processing apparatus TDx has been described above, it can also be considered as a functional configuration as the image processing apparatus TDy.

However, in the case of the image processing apparatus TDy, the image data that is a processing target by the shake change unit 100 and the normalization shake information SCI are data associated by the image processing apparatus TDx or the like at the time of previous shake change.

Furthermore, in a case where the image source VS and the image processing apparatus TDx are achieved by, for example, the image-capturing apparatus 1 or the like as described with reference to FIG. 1B, it is also conceivable that the functions of FIGS. 6, 7, and 8 are included in the camera signal processing unit 13 or the camera control unit 18 of the image-capturing apparatus 1 so as to function as the image processing apparatus TDx.

<3. Shake Change and Normalization of Shake Information>

Here, processing of shake addition and shake partial removal of the embodiment, and normalization of shake information by the shake information normalization unit 105 will be described.

It can be deemed that the processing of the present embodiment adjusts the intensity of shake according to the angle of view of the image of a processing target.

In a case where a shake amount is designated by an angle (a rotation angle of a celestial sphere model MT described later) as shake addition or shake partial removal, even with the same instruction value, an appearance (a ratio of a magnitude of shake to an angle of view) differs depending on the angle of view of an image to be subjected to application.

For this reason, for example, in a case where data of the same shake is applied to two images having different angles of view, in order to obtain a shake production effect of the same degree in terms of the ratio with respect to the angle of view, it is necessary to set different intensities, which is complicated.

Therefore, in the present embodiment, the magnitude of the shake applied by shake change is normalized by the angle of view of the image.

For example, a reference angle of view assumed as shake data is determined in advance, and the magnitude of shake is adjusted according to a relationship between the reference angle of view and the angle of view of an image to be actually subjected to shake change.

For example, in a case where a shake is newly added to a shake-free image or the like, (shake addition amount after normalization)=(original shake addition amount)×((target image angle of view)/(reference angle of view))

is established.

Note that the original shake addition amount is the output shake information generated by the shake information processing unit 101. For example, it is equivalent of a shake change quaternion eQD described later having been subjected to gain adjustment according to a user operation or the like.

The reference angle of view is a certain angle of view determined in advance as a reference.

Furthermore, in a case where shake partial removal is performed by adjusting a shake removal amount for an image with shake, (shake remaining amount after normalization)=(original shake remaining amount)×((angle of view of image after clipping)/(angle of view of captured image))

is established.

Note that the original shake remaining amount is the output shake information adjusted by the shake information processing unit 101. For example, this also is equivalent of a shake change quaternion eQD described later having been subjected to gain adjustment according to a user operation or the like.

Such normalization is conceivable to be based on performing processing with all images aligned to the vertical angle of view, for example. This is because the vertical angles of view often become the same when the same scene is captured at different aspect ratios.

Then, in order to perform normalization according to the angle of view of the shake amount, as the reference angle of view, information of at least the vertical angle of view is left as metadata.

Figure 9A:
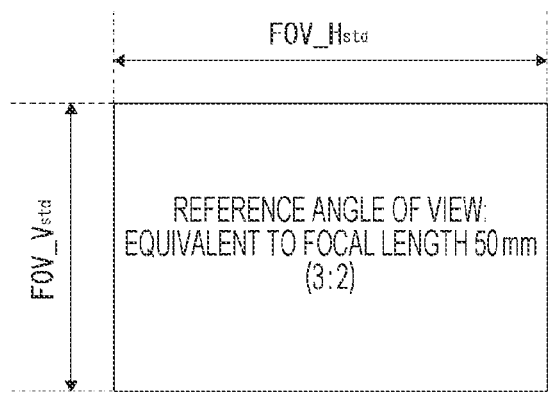
FIGS. 9A and 9B are explanatory diagrams of normalization of the embodiment.
Figure 9B:
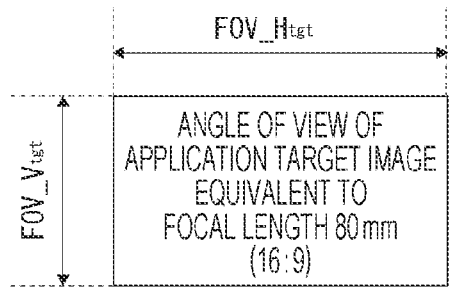

FIG. 9A illustrates a vertical angle of view FOV_Vstd and a horizontal angle of view FOV_Hstd as reference angles of view. Furthermore, FIG. 9B illustrates a vertical angle of view FOV_Vtgt and a horizontal angle of view FOV_Htgt as the angle of view of the image of a processing target.

In the case of this figure, FOV_Vstd≈27 [deg] and FOV_Vtgt≈14.4 [deg].

Here, "(target image angle of view)/(reference angle of view)" and "(angle of view of image after clipping)/(angle of view of captured image)" of the above-described normalization arithmetic expressions are defined as a normalization coefficient α.

Then, assuming that "shake addition amount after normalization" and "shake remaining amount after normalization" are the normalization shake information SCI described above, and "original shake addition amount" and "original shake remaining amount" are the shake information output by the shake information processing unit 101, normalization shake information SCI=(shake information)×α is true.

Then, considering processing with the vertical angle of view in the case of FIGS. 9A and 9B, normalization coefficient α=FOV_Vtgt/FOV_Vstd is true. That is, normalization shake information SCI(shake information)×(FOV_Vtgt/FOV_Vstd)

is established.

For example, by performing such normalization processing and performing shake change according to the normalization shake information SCI, the degree of shake (way the shake appears) does not greatly vary depending on the angle of view.

Note that, although the example using the vertical angle of view has been described above, the normalization coefficient α may be obtained by the horizontal angle of view or an oblique (diagonal) angle of view.

Figure 10:
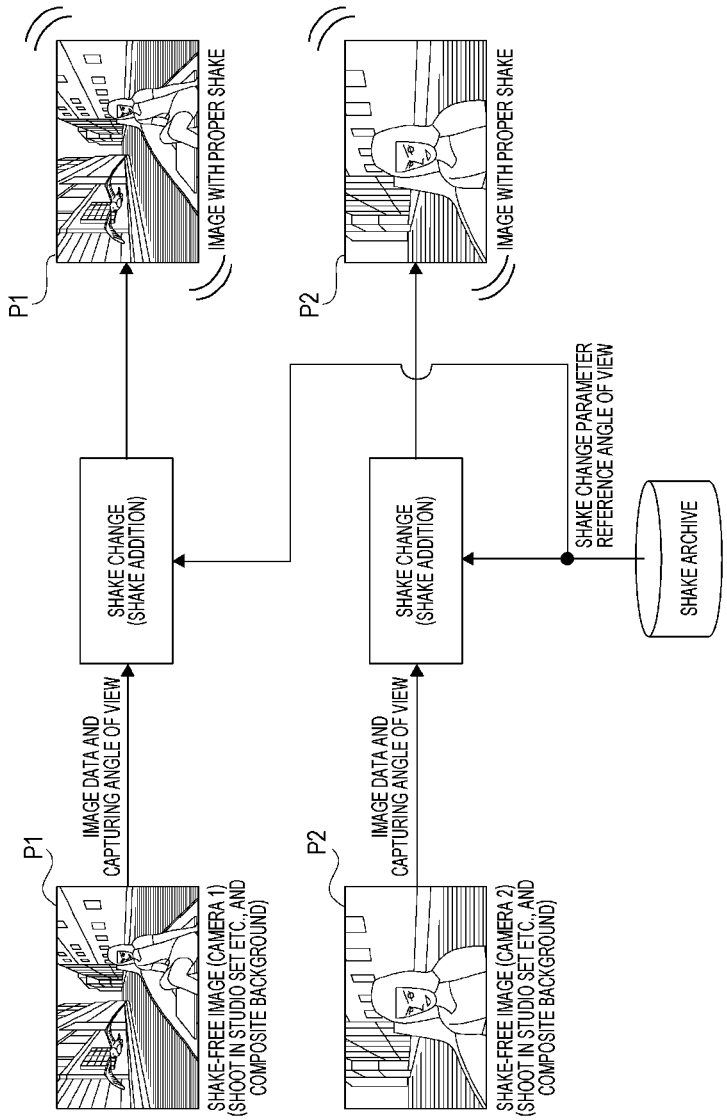
FIG. 10 is an explanatory diagram of shake addition of the embodiment.

FIG. 10 schematically illustrates a case where shake change is performed on an image P1 and an image P2 that has a smaller angle of view. It is assumed that the image P1 is captured by a certain camera in a studio set or the like and a background is synthesized. Furthermore, it is assumed that the image P2 is captured with zoom with another camera in the same studio set or the like and a background is synthesized. In this case, it is assumed to add a ship shake according to a shake pattern stored as a shake archive, for example.

When shake information is generated using the shake change parameter PRM for adding the shake and the shake addition is performed, even a shake that looks appropriate for the image P1 becomes a visually violent shake for the image P2.

Therefore, in this case, the shake information is normalized by the normalization coefficient α using the image capturing angle of view and the reference angle of view of each target image, and the shake change is performed using the normalization shake information SCI. This enables moderate shake to be expressed for the both as illustrated.

Figure 11:
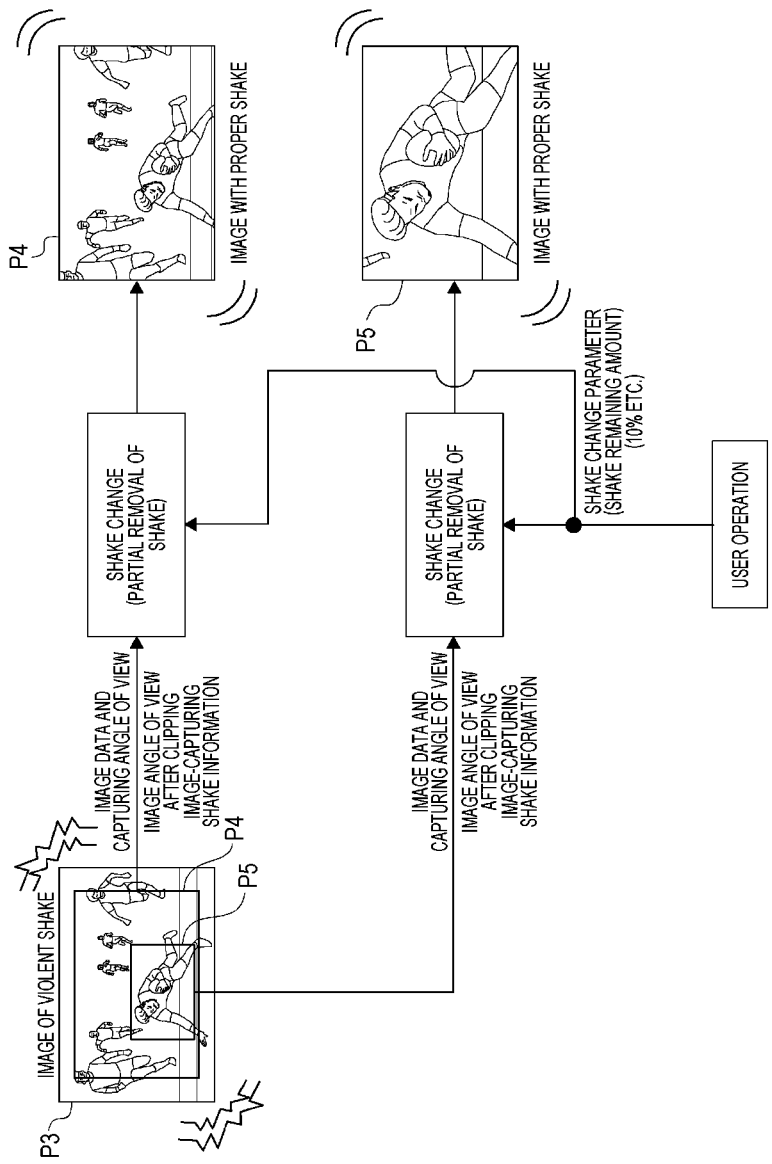
FIG. 11 is an explanatory view of shake partial removal of the embodiment.

FIG. 11 illustrates a case where images P4 and P5 having different angles of view are clipped from an image P3 originally having a violent shake. In this case, for each of the images P4 and P5 to be clipped, shake change is performed by inputting image data, image angle of view of captured image, angle of view of image after clipping, and the image-capturing time shake information.

Furthermore, for shake partial removal, for example, a shake change parameter according to the shake remaining amount designated by the user is input.

If the shake change is performed without normalizing the image-capturing time shake information and the shake information obtained only from the shake change parameter, it is assumed that the images P4 and P5 are not brought into a shake remaining state as intended by the user. Therefore, the shake change is performed using the normalization shake information SCI normalized using the normalization coefficient α obtained from the angle of view of captured image and the angle of view of image after clipping. Due to this, the images P4 and P5 visually express the same degree of shake.

<4. Image File and Metadata>

Hereinafter, an example in which the above-described shake information normalization is performed for the image file MF captured by the image-capturing apparatus 1 serving as the image source VS and input to the image processing apparatus TDx will be described.

First, the content of the image file MF and the content of the metadata to be transmitted from the image source VS such as the image-capturing apparatus 1 to the image processing apparatus TDx will be described.

FIG. 12A illustrates data included in the image file MF. As illustrated, the image file MF includes various data as "header", "sound", "movie", and "metadata".

In "header", information indicating the presence or absence of metadata and the like are described together with information such as a file name and a file size.

"Sound" is audio data recorded together with the movie. For example, two-channel stereo audio data is stored.

"Movie" is movie data, and includes image data as each frame (#1, #2, #3 . . . ) constituting the movie.

As "metadata", additional information associated with the respective frames (#1, #2, #3 . . . ) constituting the movie is described.

A content example of the metadata is illustrated in FIG. 12B. For example, IMU data, the coordinate transformation parameter HP, timing information TM, and a camera parameter CP are described for one frame. Note that these are part of the metadata content, and only information related to image processing described later is illustrated here.

As the IMU data, a gyro (angular velocity data), an accelerator (acceleration data), and a sampling rate are described.

The IMU mounted on the image-capturing apparatus 1 as the sensor unit 23 outputs angular velocity data and acceleration data at a predetermined sampling rate. In general, this sampling rate is higher than the frame rate of the captured image, and thus many IMU data samples are obtained in one frame period.

Therefore, as the angular velocity data, n samples are associated with one frame, such as a gyro sample #1, a gyro sample #2, . . . , and a gyro sample #n illustrated in FIG. 12C.

Furthermore, also as the acceleration data, m samples are associated with one frame, such as an accelerator sample #1, an accelerator sample #2, . . . , and an accelerator sample #m.

There is a case where n=m and there is a case where n≠m.

Note that, although the example in which the metadata is associated with each frame is described here, there is a case where, for example, IMU data is not completely synchronized with a frame. In such case, for example, time information related to time information of each frame is made to be held as an IMU sample timing offset in the timing information TM.

The coordinate transformation parameter HP is a generic term for parameters used for correction involving coordinate transformation of each pixel in an image. It also includes non-linear coordinate transformation such as lens distortion.

Then, the coordinate transformation parameter HP is a term that can include at least a lens distortion correction parameter, a trapezoidal distortion correction parameter, a focal plane distortion correction parameter, an electrical image stabilization parameter, and an optical image stabilization parameter.

The lens distortion correction parameter is information for directly or indirectly grasping how distortion such as barrel aberration and pincushion aberration is corrected and returning the image to an image before lens distortion correction. The metadata regarding the lens distortion correction parameter as one of the metadata will be briefly described.

Figure 13A:
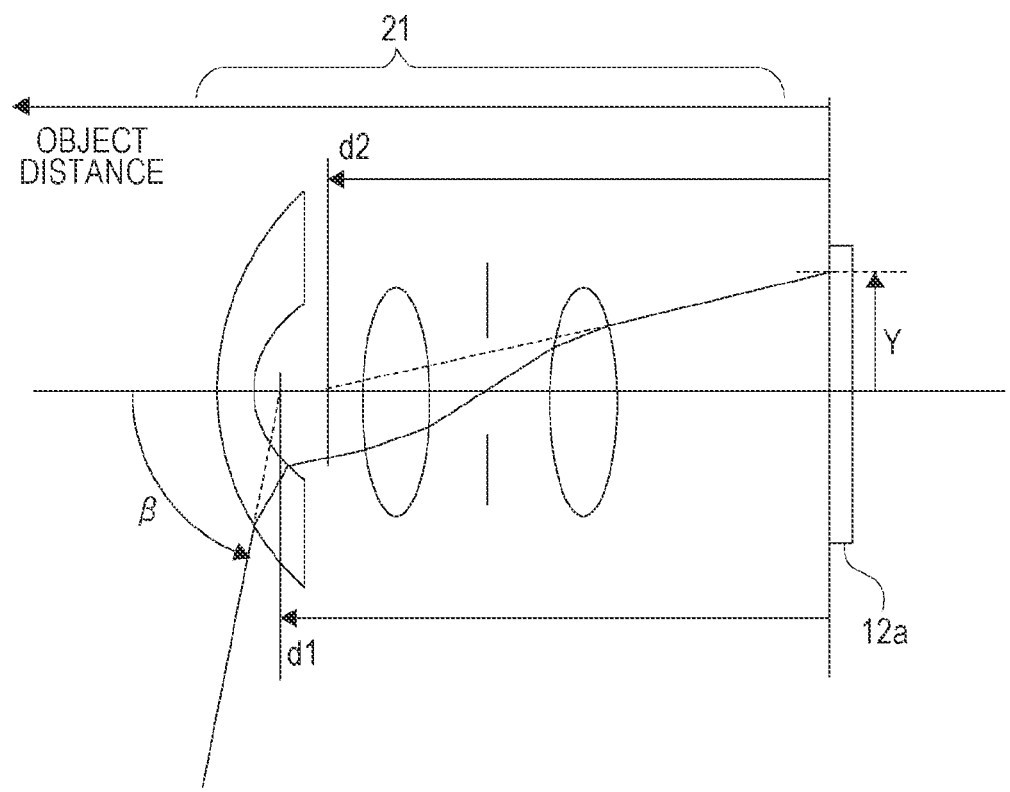
FIGS. 13A and 13B are explanatory diagrams of metadata regarding lens distortion correction.

FIG. 13A illustrates an image height Y, an angle β, an incident pupil position d1, and an exit pupil position d2 in a schematic diagram of the lens system 11 and the image sensor 12a.

The lens distortion correction parameter is used to know the incident angle for each pixel of the image sensor 12a in the image processing. Therefore, it is only required to know the relationship between the image height Y and the angle β.

Figure 13B:
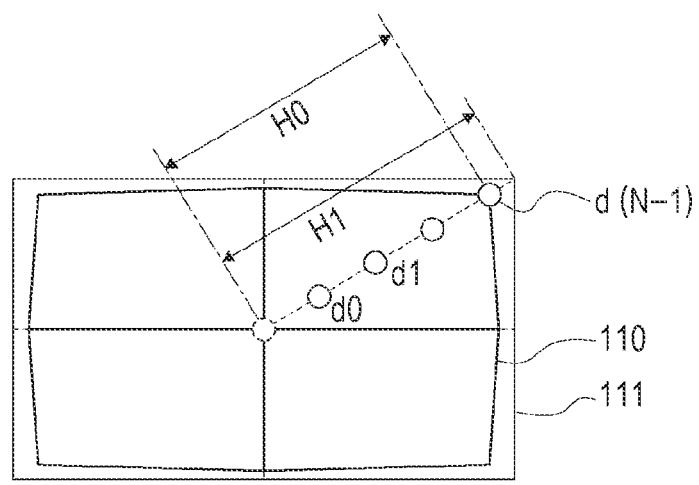

FIG. 13B illustrates an image 110 before lens distortion correction and an image 111 after lens distortion correction. A maximum image height H0 is a maximum image height before distortion correction, and is a distance from the center of the optical axis to the farthest point. A maximum image height H1 is a maximum image height after distortion correction.

What is necessary as metadata so that the relationship between the image height Y and the angle β is known is the maximum image height H0 before distortion correction and data d0, d1, . . . d (N−1) of the incident angle with respect to the respective N image heights. "N" is assumed to be about 10 as an example.

Returning to FIG. 12B, the trapezoidal distortion correction parameter is a correction amount at the time of correction of trapezoidal distortion caused by shifting the clipping region from the center by the electrical image stabilization, and also has a value corresponding to the correction amount of the electrical image stabilization.

The focal plane distortion correction parameter is a value indicating a correction amount for each line with respect to focal plane distortion.

The electrical image stabilization and the optical image stabilization are parameters indicating a correction amount in each axial direction of yaw, pitch, and roll.

Note that the parameters of the lens distortion correction, the trapezoidal distortion correction, the focal plane distortion correction, and the electrical image stabilization are collectively referred to as coordinate transformation parameters, and this is because these correction processing are correction processing for an image formed on each pixel of the image sensor 12a of the image-capturing element unit 12, and they are parameters of correction processing involving coordinate transformation of each pixel. This is because, although the optical image stabilization is also one of the coordinate transformation parameters, correction of shake of an interframe component in the optical image stabilization becomes processing involving coordinate transformation of each pixel.

That is, by performing reverse correction using these parameters, image data subjected to the lens distortion correction, the trapezoidal distortion correction, the focal plane distortion correction, the electrical image stabilization, and the optical image stabilization can be returned to a state before each correction processing, that is, the state when the image is formed on the image sensor 12a of the image-capturing element unit 12.

Furthermore, parameters of the lens distortion correction, the trapezoidal distortion correction, and the focal plane distortion correction are collectively referred to as optical distortion correction parameters because they are distortion correction processing for a case where the optical image itself from the subject is an image captured in an optically distorted state, and each parameter is intended for optical distortion correction.

That is, when inverse correction is performed using these parameters, image data subjected to the lens distortion correction, the trapezoidal distortion correction, and the focal plane distortion correction can be returned to the state before the optical distortion correction.

The timing information TM in metadata includes information of an exposure time (shutter speed), an exposure start timing, a read time (curtain speed), the number of exposure frames (long second exposure information), an IMU sample offset, and a frame rate.

In the image processing of the present embodiment, these are mainly used to associate the line of each frame with IMU data.

However, even in a case where the image sensor 12a is a CCD or a global shutter type CMOS, in a case where the exposure center of gravity is shifted by using an electronic shutter or a mechanical shutter, it is possible to perform correction in accordance with the exposure center of gravity by using the exposure start timing and the curtain speed.

As the camera parameter CP in the metadata, an angle of view (focal length), a zoom position, and lens distortion information are described.

<5. Processing Example>

A processing example of the information processing apparatus 70 serving as the image processing apparatus TDx as the embodiment will be described.

FIG. 14 illustrates a procedure of various types of processing executed in the information processing apparatus 70 as the image processing apparatus TDx, and illustrates the relationship among information used in each processing.

Note that at least the processing of step ST17 only needs to be performed depending on the function of the shake change unit 100 illustrated in FIG. 6 and the like. However, steps ST11, ST12, ST13, ST14, ST18, and ST19 can also be considered as processing of the shake change unit 100.

Furthermore, depending on the function of the shake information processing unit 101, processing of step ST15 is performed.

Depending on the function of the shake information normalization unit 105, processing of step ST16 is performed.

Depending on the function of the UI processing unit 103, processing of step ST40 is performed.

Depending on the function of the parameter setting unit 102, processing of step ST41 is performed.

Depending on the function of the association unit 106, processing of step ST20 is performed.

First, steps ST1, ST2, ST3, and ST4 as preprocessing will be described.

The preprocessing is processing performed when the image file MF is imported.

The term "import" as used here refers to setting, as an image processing target, the image file MF or the like that can be accessed by being taken in to the storage unit 79 or the like, for example, by the information processing apparatus 70, and refers to performing preprocessing to develop the file so as to enable image processing. For example, it does not refer to transferring from the image-capturing apparatus 1 to the mobile terminal 2 or the like.

The CPU 71 imports the image file MF designated by a user operation or the like so as to be an image processing target, and performs processing related to the metadata added to the image file MF as preprocessing. The CPU 71 performs processing of extracting and storing metadata corresponding to each frame of a movie, for example.

Specifically, in this preprocessing, metadata extraction (step ST1), all IMU data consolidation (step ST2), metadata retention (step ST3), and conversion into quaternion (posture information of the image-capturing apparatus 1) and retention (step ST4) are performed.

As metadata extraction in step ST1, the CPU 71 reads the target image file MF and extracts the metadata included in the image file MF as described with reference to FIGS. 12A, 12B, and 12C.

Note that part or all of steps ST1, ST2, ST3, and ST4 may be performed on the image source VS side such as the image-capturing apparatus 1. In that case, in the preprocessing, the content after those processing described below are acquired as metadata.

The CPU 71 performs consolidation processing in step ST2 regarding IMU data (angular velocity data (gyro sample) and acceleration data (accelerator sample)) among the extracted metadata.

This is processing of arranging and consolidating all pieces of IMU data associated with all frames in time series order and constructing IMU data corresponding to the entire sequence of the movie.

Then, integration processing is performed on the consolidated IMU data to calculate, store, and retain a quaternion QD representing the posture of the image-capturing apparatus 1 at each time point on the sequence of the movie. Calculating the quaternion QD is an example.

Note that the quaternion QD can be calculated only with angular velocity data.

The CPU 71 performs processing of retaining, in step ST3, metadata other than the IMU data, that is, the coordinate transformation parameter HP, the timing information TM, and the camera parameter CP among the extracted metadata. That is, the coordinate transformation parameter HP, the timing information TM, and the camera parameter CP are stored in a state corresponding to each frame.

By performing the above preprocessing, the CPU 71 is prepared to perform various types of image processing including shake change on image data received as the image file MF.

The steady state processing in FIG. 10 indicates image processing performed, as a target, on the image data of the image file MF subjected to the preprocessing as described above.

The CPU 71 performs processing of one frame extraction of the movie (step ST11), internal correction cancellation of image-capturing apparatus (step ST12), pasting to the celestial sphere model (step ST13), synchronization processing (step ST14), shake information adjustment/generation (step ST15), shake information normalization (step ST16), shake change (step ST17), plane projection and clipping (step ST18), output region designation (step ST19), and association recording/reproduction (step ST20).

The CPU 71 performs each processing of steps ST11 to ST20 described above for each frame at the time of image reproduction of the image file MF.

In step ST11, the CPU 71 decodes one frame of the movie (image file MF) along a frame number FN. Then, image data PD (#FN) of one frame is output. Note that "(#FN)" indicates a frame number and indicates information corresponding to the frame.

Note that in a case where the movie has not been subjected to encoding processing such as compression, the decoding processing in step ST11 is unnecessary.

In step ST12, the CPU 71 performs processing of canceling the internal correction performed by the image-capturing apparatus 1 for the image data PD (#FN) of one frame.

For this purpose, with reference to the coordinate transformation parameter HP (#FN) stored corresponding to the frame number (#FN) at the time of preprocessing, the CPU 71 performs reverse correction to the correction performed by the image-capturing apparatus 1. Thus, image data iPD (#FN) in a state where the lens distortion correction, the trapezoidal distortion correction, the focal plane distortion correction, the electrical image stabilization, and the optical image stabilization in the image-capturing apparatus 1 are canceled is obtained. That is, it is image data where shake removal and the like performed by the image-capturing apparatus 1 have been canceled and the influence of the shake such as camera shake at the time of image capturing appears as it is. This is because the correction processing at the time of image capturing is canceled to bring into the state before correction, and more accurate shake removal and shake addition using image-capturing time shake information (for example, quaternion QD) are performed.

However, the processing of internal correction cancellation of image-capturing apparatus as step ST12 needs not be performed. For example, the processing of step ST12 may be skipped, and the image data PD (#FN) may be output as it is.

In step ST13, the CPU 71 pastes the image data iPD (#FN) of one frame or the image data PD (#FN) of one frame to the celestial sphere model. At this time, the camera parameter CP (#FN) stored corresponding to the frame number (#FN), that is, the angle of view, the zoom position, and the lens distortion information are referred to.

Figure 15A:
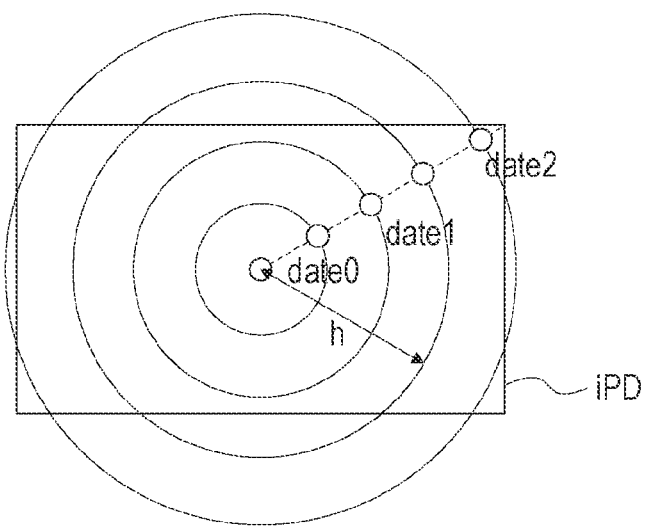
FIGS. 15A, 15B, and 15C are explanatory diagrams of pasting to a celestial sphere model of the embodiment.
Figure 15B:
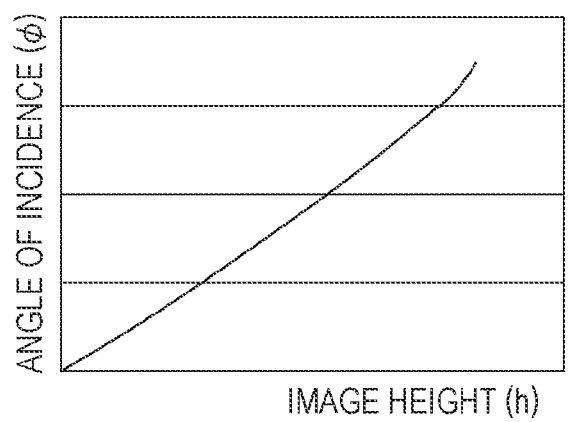
Figure 15C:
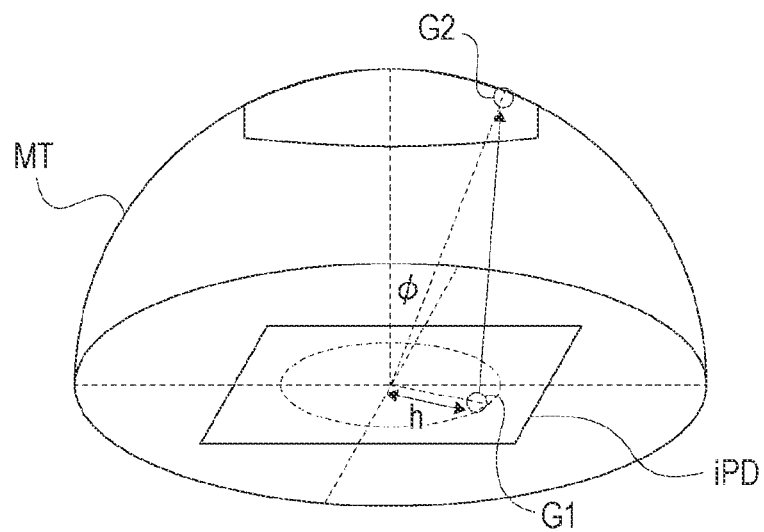

FIGS. 15A, 15B, and 15C illustrate an outline of pasting to the celestial sphere model.

FIG. 15A illustrates the image data iPD. Note that there is also a case of the image data PD, but the same applies hereinafter.

The image height h is a distance from the image center. Each circle in the figure indicates the position where the image height h becomes equal.

From the angle of view, the zoom position, and the lens distortion information of a frame of this image data iPD, "relationship between an image sensor surface and an incident angle $\varphi$" in the frame is calculated and set as "data 0" . . . "data N−1" at each position of the image sensor surface. Then, the relationship is expressed as a one-dimensional graph of a relationship between the image height h and the incident angle $\varphi$ as in FIG. 15B from "data 0" . . . and "data N−1". The incident angle $\varphi$ is an angle of a light beam (an angle viewed from the optical axis).

The one-dimensional graph is rotated once around the center of the captured image, and the relationship between each pixel and the incident angle is obtained.

Accordingly, mapping of each pixel of the image data iPD onto the celestial sphere model MT is performed such as a pixel G1 in FIG. 15C to a pixel G2 on a celestial sphere coordinates.

As described above, an image (data) of the celestial sphere model MT in which a captured image is pasted to an ideal celestial sphere surface in a state where lens distortion is removed is obtained. In this celestial sphere model MT, parameters and distortion unique to the image-capturing apparatus 1 that originally captured the image data iPD are removed, and the range visible by an ideal pinhole camera is what is pasted to the celestial sphere surface.

Therefore, by rotating the image of the celestial sphere model MT in a predetermined direction in this state, shake change processing as shake removal or shake addition can be achieved.

Here, posture information (quaternion QD) of the image-capturing apparatus 1 is used for the shake change processing. For this purpose, the CPU 71 performs synchronization processing in step ST14.

In the synchronization processing, processing of specifying and acquiring a quaternion QD (#LN) suitable for each line is performed corresponding to the frame number FN. Note that "(#LN)" indicates the line number in a frame and represents information corresponding to the line.

Note that the reason for use of the quaternion QD (#LN) for each line is that in a case where the image sensor 12*a* is a CMOS type and performs rolling shutter image capturing, the amount of shake varies for each line.

For example, in a case where the image sensor 12*a* is a CCD type and performs global shutter image capturing, it is sufficient to use the quaternion QD (#FN) in units of frames.

Note that even in the case of a global shutter of a CCD or a CMOS as the image sensor 12*a*, the center of gravity is shifted when an electronic shutter (the same applies to a mechanical shutter) is used, and therefore, it is preferable to use a quaternion at the timing of the center (shifted according to the shutter speed of the electronic shutter) of the exposure period of the frame.

Here, blur appearing in an image is considered.

The blur occurs in an image due to relative motion between an image-capturing apparatus and a subject in a same frame. That is, the image blur is caused by shake within an exposure time. The longer the exposure time becomes, the stronger the influence of blur becomes.

In the electrical image stabilization, in a case where a method of controlling an image range clipped for each frame is used, "shake" occurring between frames can be reduced/eliminated, but relative shake within an exposure time cannot be reduced by such electrical image stabilization.

Furthermore, when the clipping region is changed by image stabilization, posture information of each frame is used. However, if the posture information deviates from the center of the exposure period such as the timing of start or end of an exposure period, the direction of shake within the exposure time based on the posture is biased, and the blur is easily noticeable. Moreover, in a rolling shutter of CMOS, the exposure period varies for every line.

Therefore, in the synchronization processing in step ST14, for each frame of the image data, the quaternion QD is acquired with reference to the timing of the exposure center of gravity for each line.

Figure 16:
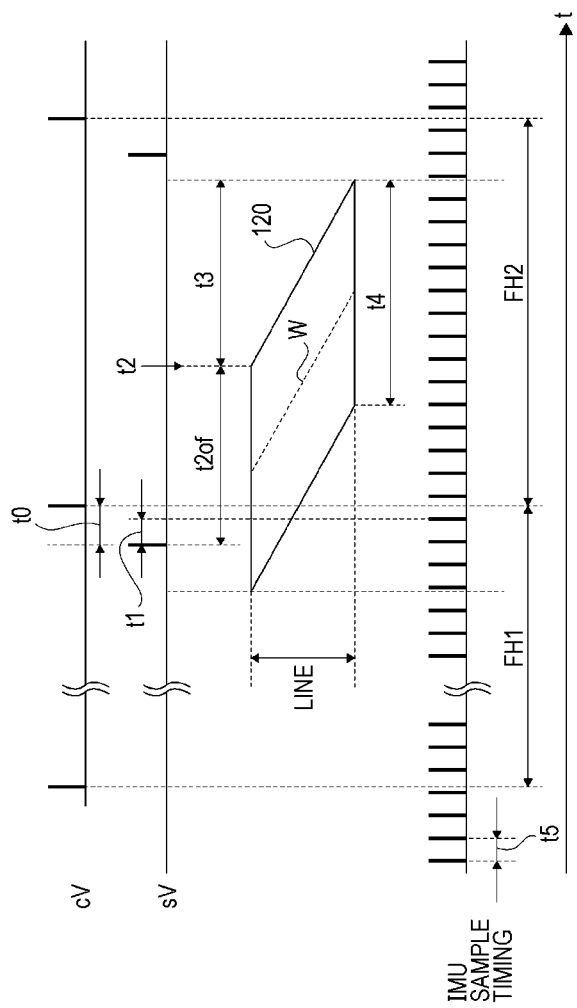
FIG. 16 is an explanatory diagram of sample timing of IMU data of the embodiment.

FIG. 16 illustrates a synchronization signal cV in the vertical period of the image-capturing apparatus 1, a synchronization signal sV of the image sensor 12a generated from this synchronization signal cV, and a sample timing of the IMU data, and also illustrates an exposure timing range 120.

The exposure timing range schematically indicates, in a parallelogram, an exposure period of each line of one frame when an exposure time t4 is set by a rolling shutter method. Furthermore, a temporal offset t0, an IMU sample timing offset t1, a read start timing t2, a read time (curtain speed) t3, and an exposure time t4 of the synchronization signal cV and the synchronization signal sV are illustrated. Note that the read start timing t2 is a timing after a predetermined time t2 of has elapsed from the synchronization signal sV.

Each IMU data obtained at each IMU sample timing is associated with a frame. For example, the IMU data in a period FH1 is metadata associated with the current frame indicating the exposure period in a parallelogram, and the IMU data in the period FH1 is metadata associated with the next frame. However, by consolidating all IMU data in step ST2 of FIG. 14, association between each frame and IMU data is released, and the IMU data can be managed in time series.

In this case, the IMU data corresponding to the exposure center of gravity (timing of broken line W) of each line of the current frame is specified. This can be calculated if the temporal relationship between the IMU data and an effective pixel region of the image sensor 12a is known.

Therefore, IMU data corresponding to the exposure center of gravity (timing of broken line W) of each line is specified using information that can be acquired as the timing information TM corresponding to the frame (#FN).

That is, it is information of the exposure time, the exposure start timing, the read time, the number of exposure frames, the IMU sample offset, and the frame rate.

Then, the quaternion QD calculated from the IMU data of the exposure center of gravity is specified and set as a quaternion QD (#LN) that is posture information for each line.

This quaternion QD (#LN) is provided to shake information adjustment/generation processing in step ST15.

In the shake information adjustment/generation processing, the CPU 71 adjusts or generates the quaternion QD according to the shake change parameter PRM having been input.

The shake change parameter PRM is a parameter input according to a user operation or a parameter generated by automatic control.

The shake change parameter PRM is generated in the parameter setting processing of step ST41.

Furthermore, by the UI processing in step ST40, the user can perform an operation input for instructing a shake change. That is, an operation of instructing a shake to be added as shake production, an operation of instructing a degree of shake removal, or the like is performed.

For example, the user can input the shake change parameter PRM itself, select a parameter, or the like so as to add a discretionary shake degree to the image. In that case, in step ST41, the shake change parameter PRM according to the user input is set and used for shake information adjustment/generation processing.

Furthermore, as the parameter setting processing in step ST41, the CPU 71 can generate and use, for shake information adjustment/generation processing, the shake change parameter PRM by automatic control according to image analysis, an image type, a selection operation of a model of shake by the user, or the like, and use the shake change parameter PRM.

Then, in the shake information adjustment/generation processing in step ST15, the CPU 71 adjusts or generates and outputs, as output shake information, a shake change quaternion eQD for adding a shake to an image or reducing the amount of shake on the basis of the shake change parameter PRM and the quaternion QD that is image-capturing time shake information.

An adjustment example using the quaternion QD as image-capturing time shake information and the shake change parameter PRM (that is, a generation example of the shake change quaternion eQD) will be described with reference to FIGS. 17, 18, and 19.

Figure 17:
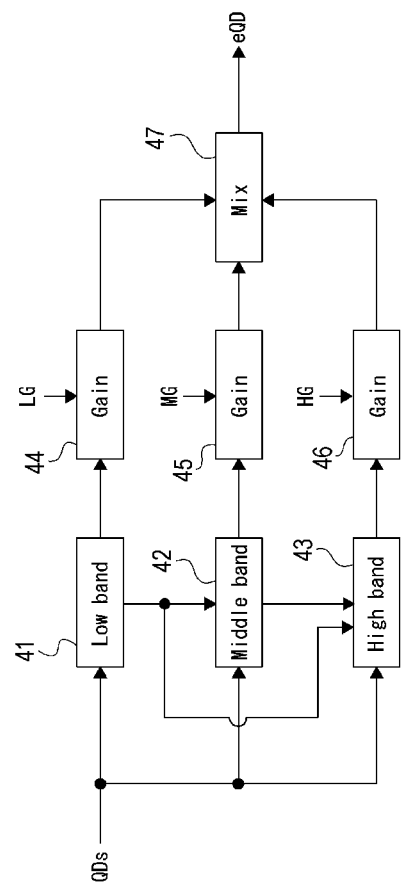
FIG. 17 is an explanatory diagram of shake information adjustment for each frequency band of the embodiment.

FIG. 17 illustrates an example of generating the shake change quaternion eQD in accordance with an instruction of a frequency band-wise gain by the shake change parameter PRM.

The frequency band is a band of a shake frequency. For the sake of description, it is assumed that the band is divided into three bands of a low band, a middle band, and a high band. Of course, this is merely an example, and the number of bands only needs to be two or more.

A low gain LG, a middle gain MG, and a high gain HG are provided as the shake change parameter PRM.

An adjustment processing system in FIG. 17 includes a low-pass filter 41, a middle-pass filter 42, a high-pass filter 43, gain arithmetic units 44, 45, and 46, and a synthesis unit 47.

"Quaternion QDs for shaking" is input to this adjustment processing system. This is the conjugation of the quaternion QDs as image-capturing time shake information.

Each value q for the current frame and the preceding and following predetermined frames as the quaternion QDs for shaking is input to the low-pass filter 41 to obtain a low component $q_{low}$.

$$q_{low} = \mathrm{mean}(q, n) \qquad \text{[Expression 1]}$$

The gain arithmetic unit 44 gives a low gain LG to this low component $q_{low}$.

Note that mean (q, n) in the expression represents a mean value of n values before and after q.

Furthermore, the value q of the quaternion QDs for shaking is input to the middle-pass filter 42 to obtain a middle component $q_{mid}$.

$$q_{mid}=q^*{}_{low}\times \mathrm{mean}(q,m) \quad \text{[Expression 2]}$$

where n>m

Note that $q^*{}_{low}$ is the conjugate of $q_{low}$.

Furthermore, "×" is a quaternion product.

The gain arithmetic unit 45 gives a middle gain MG to this middle component $q_{mid}$.

Furthermore, the value q of the quaternion QDs for shaking is input to the high-pass filter 43 to obtain a high component $q_{high}$.

$$q_{high}=q^*{}_{mid}\times q^*{}_{low}\times q \quad \text{[Expression 3]}$$

Note that q*mid is the conjugate of $q_{mid}$.

The gain arithmetic unit 46 gives a high gain HG to this high component $q_{high}$.

These gain arithmetic units 44, 45, and 46 assume input as "$q_{in}$".

$$q_{in} = \left[\cos\frac{\theta}{2}\ a_x\sin\frac{\theta}{2}\ a_y\sin\frac{\theta}{2}\ a_z\sin\frac{\theta}{2}\right] \quad \text{[Expression 4]}$$

At this case, a next "$q_{out}$" is output with θ'=θ*gain.

(where gain is the low gain LG, the middle gain MG, and the high gain HG.)

$$q_{out} = \left[\cos\frac{\theta'}{2}\ a_x\sin\frac{\theta'}{2}\ a_y\sin\frac{\theta'}{2}\ a_z\sin\frac{\theta'}{2}\right] \quad \text{[Expression 5]}$$

By such gain arithmetic units 44, 45, and 46, the low component $q_{low}$, the middle component $q_{mid}$, and the high component $q_{high}$ to which the low gain LG, the middle gain MG, and the high gain HG are given, respectively, are obtained. These are synthesized by the synthesis unit 47 to obtain a value $q_{mixed}$.

$$q_{mixed}=q_{low}\times q_{mid}\times q_{high} \quad \text{[Expression 6]}$$

Note that "×" is a quaternion product.

The value $q_{mixed}$ thus obtained becomes the value of the shake change quaternion eQD.

Although the above is an example of band division, a method of generating the shake change quaternion eQD in which a gain according to the shake change parameter PRM is given without band division is also conceivable.

Figure 18:
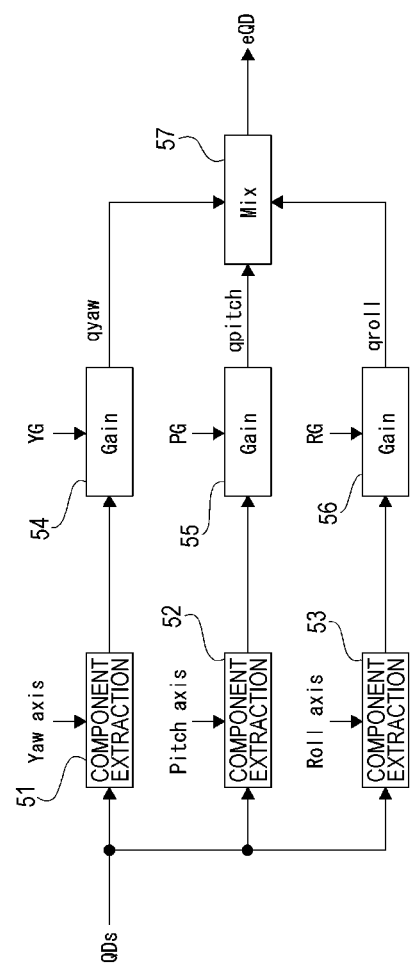
FIG. 18 is an explanatory diagram of shake information adjustment for each direction of the embodiment.

Next, FIG. 18 illustrates an example in which the shake change quaternion eQD is generated according to an instruction of a gain for each direction by the shake change parameter PRM.

The direction is a direction of shaking, that is, directions of yaw, pitch, and roll.

A yaw gain YG, a pitch gain PG, and a roll gain RG are given as the shake change parameter PRM.

An adjustment processing system in FIG. 18 includes a yaw component extraction unit 51, a pitch component extraction unit 52, a roll component extraction unit 53, gain arithmetic units 54, 55, and 56, and a synthesis unit 57.

The yaw component extraction unit 51, the pitch component extraction unit 52, and the roll component extraction unit 53 are provided with information on a yaw axis, a pitch axis, and a roll axis, respectively.

Respective values q for the current frame and the preceding and following predetermined frames as the quaternion QDs for shaking are input to the yaw component extraction unit 51, the pitch component extraction unit 52, and the roll component extraction unit 53, respectively, to obtain a yaw component $q_{yaw}$, a pitch component $q_{pitch}$, and a roll component $q_{roll}$.

Each component extraction processing assumes a next "$q_{in}$" as input.

$$q_{in} = \left[\cos\frac{\theta}{2}\ a_x\sin\frac{\theta}{2}\ a_y\sin\frac{\theta}{2}\ a_z\sin\frac{\theta}{2}\right] \quad \text{[Expression 7]}$$

$$u = [u_x\ u_y\ u_z]$$

u is a unit vector representing the direction of an axis such as the yaw axis, the pitch axis, or the roll axis.

At this case, a next "$q_{out}$" is output with θ'=θ*(a·u).

$$q_{out} = \left[\cos\frac{\theta'}{2}\ u_x\sin\frac{\theta'}{2}\ u_y\sin\frac{\theta'}{2}\ u_z\sin\frac{\theta'}{2}\right] \quad \text{[Expression 8]}$$

For the yaw component $q_{yaw}$, the pitch component $q_{pitch}$, and the roll component $q_{roll}$ obtained by such component extraction, the gain arithmetic units 54, 55, and 56 give the yaw gain YG, the pitch gain PG, and the roll gain RG, respectively.

Then, the yaw component $q_{yaw}$, the pitch component $q_{pitch}$ and the roll component $q_{roll}$ subjected to the gain arithmetic operation are synthesized by the synthesis unit 47 to obtain the value $q_{mixed}$.

$$q_{mixed}=q_{yaw}\times q_{pitch}\times q_{roll} \quad \text{[Expression 9]}$$

Note that "×" in this case is also a quaternion product.

The value $q_{mixed}$ thus obtained becomes the value of the shake change quaternion eQD.

Figure 19:
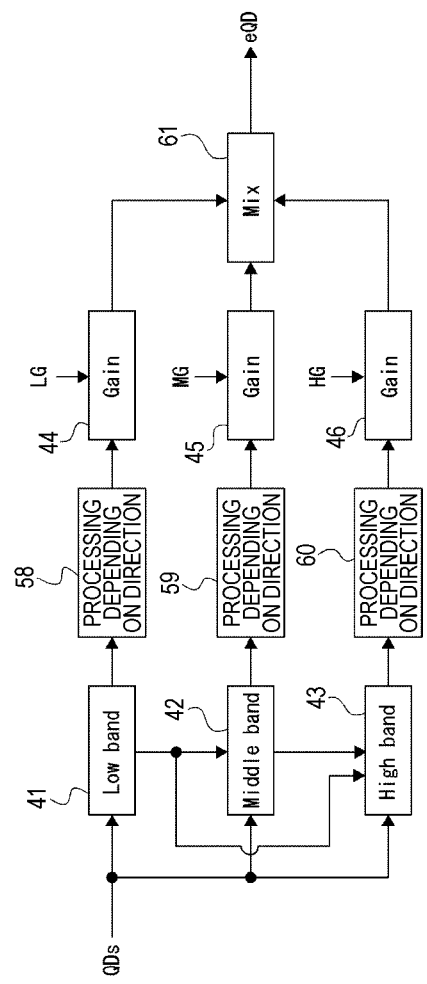
FIG. 19 is an explanatory diagram of shake information adjustment for each frequency band and for each direction of the embodiment.

FIG. 19 illustrates an example in which the frequency band and the direction are combined.

An adjustment processing system includes the low-pass filter 41, the middle-pass filter 42, the high-pass filter 43, direction-wise processing units 58, 59, and 60, the gain arithmetic units 44, 45, and 46, and a synthesis unit 61.

Depending on the shake change parameter PRM, the low gain LG, the middle gain MG, the high gain HG, and the yaw gain YG, the pitch gain PG, and the roll gain RG that are not illustrated are given.

In this adjustment processing system, respective values q for the current frame and the preceding and following predetermined frames as the quaternion QDs for shaking supplied to the low-pass filter 41, the middle-pass filter 42, and the high-pass filter 43, respectively, to obtain respective band components. The respective band components are input to the direction-wise processing units 58, 59, and 60.

Each of the direction-wise processing units 58, 59, and 60 are assumed to include the yaw component extraction unit 51, the pitch component extraction unit 52, the roll component extraction unit 53, the gain arithmetic units 54, 55, and 56, and the synthesis unit 57 in FIG. 18.

That is, the direction-wise processing unit 58 divides the low component of the quaternion QDs for shaking into components in the yaw direction, the roll direction, and the pitch direction, performs gain arithmetic operation using the yaw gain YG, the pitch gain PG, and the roll gain RG, and then synthesizes them.

The direction-wise processing unit 59 divides the middle component of the quaternion QDs for shaking into components in the yaw direction, the roll direction, and the pitch direction, similarly performs gain arithmetic operation, and then synthesizes them.

The direction-wise processing unit 60 divides the high component of the quaternion QDs for shaking into components in the yaw direction, the roll direction, and the pitch direction, similarly performs gain arithmetic operation, and then synthesizes them.

Outputs of these direction-wise processing units 58, 59, and 60 are supplied to the gain arithmetic units 44, 45, and 46, respectively, and are given the low gain LG, the middle gain MG, and the high gain HG, respectively. Then, they are synthesized by the synthesis unit 61 and output as a value of the shake change quaternion eQD.

In the example of FIG. 19 described above, after division to the frequency band first, direction direction-wise processing is applied for each band component, but this may be reversed. That is, after division for each direction first, frequency band-wise processing may be applied for each direction component.

In step ST15 of FIG. 10, for example, the shake change quaternion eQD is generated by the above processing example.

However, the above description can be considered as an example of a case where the shake change quaternion eQD is generated by adjusting the quaternion QD that is image-capturing time shake information. For example, this becomes a processing example for a case where shake partial removal is performed. Alternatively, this becomes a processing example for a case where shake addition is performed such that a shake is added to the original shake.

In a case where a shake-free image (for example, image data iPD) is assumed as a target of shake change, and shake addition of newly adding a shake is performed, it is only required to generate the shake change quaternion eQD on the basis of the shake change parameter PRM without using the quaternion QD, which is image-capturing time shake information.

By the way, in the above example, the low gain LG, the middle gain MG, and the high gain HG are given as the shake change parameter PRM, and these are the shake change parameter PRM according to the result of detecting the user operation as the UI processing, for example.

In this case, in a case of being viewed from the user, it is possible to provide an operation that is intuitively easy to understand if the change amount in shake (shake remaining amount) can be recognized and input in angle. The angle mentioned here is a rotation angle on the celestial sphere model MT. It is preferable to be able to operate with angle also in a case of shake addition.

As the rotation desired to express, that is, the amount of shake, a unit vector a representing its rotation axis is expressed by $$a=(a_x a_y a_z)^T$$

and where the angle of rotation (rotation amount) is θ[rad], a quaternion q corresponding to the rotation is as follows (Expression 10).

$$q = \left[\cos\frac{\theta}{2} \quad a_x\sin\frac{\theta}{2} \quad a_y\sin\frac{\theta}{2} \quad a_z\sin\frac{\theta}{2}\right] \quad \text{[Expression 10]}$$

For example, in the parameter setting processing of step ST41, the input by the angle of the user is converted into the quaternion q with respect to the rotation in this manner, and this is only required to be applied to (Expression 4) (Expression 7) and the like described above.

The shake change quaternion eQD generated in the shake information adjustment/generation processing of step ST15 is provided to the shake information normalization processing of step ST16.

In the shake information normalization processing, the shake change quaternion eQD is normalized using the normalization coefficient α.

First, it is described that the normalization shake information SCI is obtained by normalization shake information SCI=(shake information)×α, and a specific example of "shake information" in this expression becomes the shake change quaternion eQD. Then, in step ST16, a normalized quaternion nQD is obtained as the normalization shake information SCI.

Now, the value of the shake change quaternion eQD, which is adjusted/generated "shake information", is assumed to be a next "$q_{ORg}$".

$$q_{org} = \left[\cos\frac{\theta}{2} \quad a_x\sin\frac{\theta}{2} \quad a_y\sin\frac{\theta}{2} \quad a_z\sin\frac{\theta}{2}\right] \quad \text{[Expression 11]}$$

Then, the value "$q_{norm}$" of the normalized quaternion nQD is calculated as follows.

$$q_{norm} = \left[\cos\frac{\alpha\theta}{2} \quad a_x\sin\frac{\alpha\theta}{2} \quad a_y\sin\frac{\alpha\theta}{2} \quad a_z\sin\frac{\alpha\theta}{2}\right] \quad \text{[Expression 12]}$$

Note that the normalization coefficient α is obtained by "(target image angle of view)/(reference angle of view)" and "(angle of view of image after clipping)/(angle of view of captured image)" as described above.

The normalized quaternion nQD generated as described above is provided to the shake change processing in step ST17.

The shake change in step ST17 can be considered as, for example, adding a shake by applying the normalized quaternion nQD to the image data iPD in a state where shake is stopped, or adjusting the image stabilization amount of the image data PD with shake.

In the image stabilization in step ST17, using the normalized quaternion nQD (#LN) for each line, the CPU 71 adds or partially removes the shake by rotating an image of the celestial sphere model MT to which the image of the frame is pasted in step ST13. An image of a celestial sphere model hMT with the shake having been changed is sent to the processing of step ST18.

Then, in step ST18, the CPU 71 projects, onto a plane, and clips the image of the celestial sphere model hMT with the shake having been changed, so that an image (output image data oPD) having been subjected to shake change is obtained.

In this case, shake change is achieved by rotation of the celestial sphere model MT, and by using the celestial sphere model MT, a trapezoidal shape does not appear even if any portion is clipped, and as a result, trapezoidal distortion is eliminated. Furthermore, as described above, since in the celestial sphere model MT, the range visible by an ideal pinhole camera is what is pasted to the celestial sphere surface, there is no lens distortion. Since the rotation of the celestial sphere model MT is performed according to the normalized quaternion nQD (#LN) for each line, focal plane distortion correction is also eliminated.

Furthermore, since the quaternion QD (#LN) corresponds to the exposure center of gravity of each line, blur is unnoticeable in the image.

Association between an image after subjected to plane projection in step ST18 and the celestial sphere model MT is as follows.

Figure 20A:
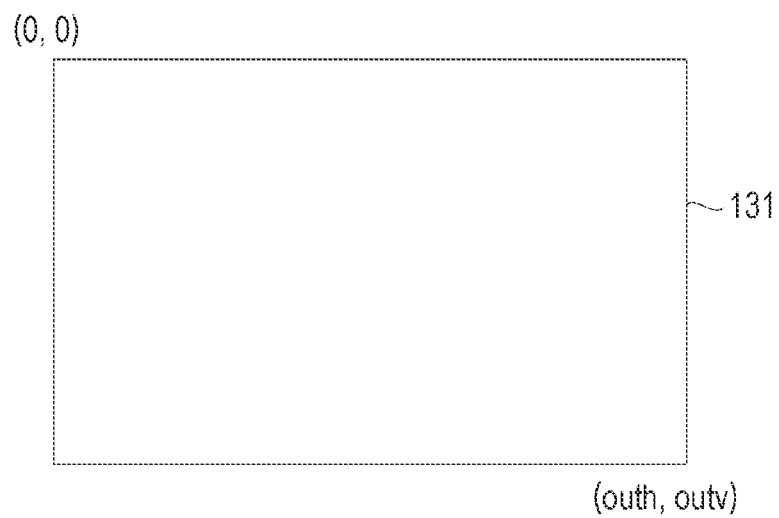
FIGS. 20A and 20B are explanatory diagrams of association between an output image and a celestial sphere model of the embodiment.

FIG. 20A illustrates an example of a rectangular coordinate plane 131 subjected to plane projection. The coordinate of the image subjected to plane projection is assumed to be (x, y).

Figure 20B:
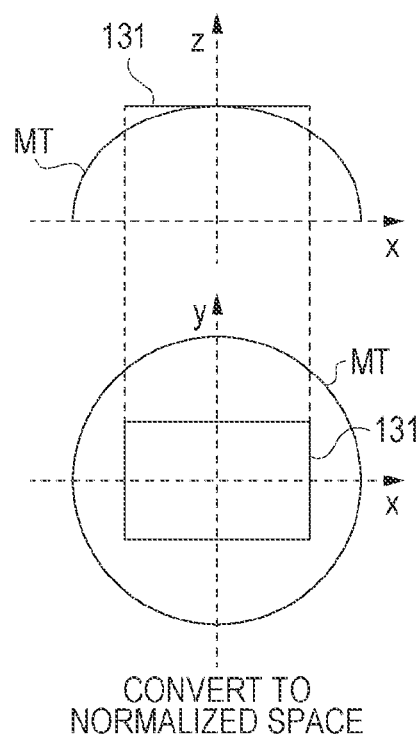

As illustrated in FIG. 20B, the coordinate plane 131 is arranged (normalized) in a three-dimensional space so as to be in contact with the center immediately above the celestial sphere model MT. That is, the center of the coordinate plane 131 is arranged at a position coinciding with the center of the celestial sphere model MT and in contact with the celestial sphere model MT.

In this case, the coordinate is normalized on the basis of zoom magnification and the size of a clipping region. For example, as in FIG. 20A, in a case where a horizontal coordinate of the coordinate plane 131 is 0 to outh and a vertical coordinate is 0 to outv, outh and outv are an image size, Then, for example, the coordinate is normalized by the following expression.

$$x_{norm} = \frac{1}{zoom} \cdot \frac{(x - outh/2)}{r}$$

$$y_{norm} = \frac{1}{zoom} \cdot \frac{(y - outv/2)}{r}$$

$$z_{norm} = 1$$

[Expression 13]

where r=min (outh, outv)/2

In the above (Expression 13), min(A, B) is a function that returns the smaller value of A and B. Furthermore, "zoom" is a parameter for controlling scaling.

Furthermore, xnorm, ynorm, and znorm are normalized x, y, and z coordinates.

The coordinate of the coordinate plane 131 is normalized to the coordinate on a spherical surface of a hemisphere having a radius 1.0 by each expression of (Expression 13) above.

For rotation in order to obtain an orientation of a clipping region, the coordinate plane 131 is rotated by a rotation matrix operation as illustrated in FIG. 21A. That is, using a rotation matrix of the following (Expression 14), rotation is performed at a pan angle, a tilt angle, and a roll angle. Here, the pan angle is a rotation angle at which the coordinate is rotated about the z axis. The tilt angle is a rotation angle at which the coordinate is rotated about the x axis, and the roll angle is a rotation angle at which the coordinate is rotated about the y axis.

$$\begin{pmatrix} x_{rot} \\ y_{rot} \\ z_{rot} \end{pmatrix} = \begin{pmatrix} 1 & 0 & 0 \\ 0 & \cos R_t & -\sin R_t \\ 0 & \sin R_t & \cos R_t \end{pmatrix}$$

$$\begin{pmatrix} \cos R_r & 0 & -\sin R_r \\ 0 & 1 & 0 \\ \sin R_r & 0 & \cos R_r \end{pmatrix} \begin{pmatrix} \cos R_p & -\sin R_p & 0 \\ \sin R_p & \cos R_p & 0 \\ 0 & 0 & 1 \end{pmatrix} \begin{pmatrix} x_{norm} \\ y_{norm} \\ z_{norm} \end{pmatrix}$$

[Expression 14]

In the above (Expression 14), "Rt" is the tilt angle, "Rr" is the roll angle, and "Rp" is the pan angle. Furthermore, (xrot, yrot, zrot) is the coordinate after rotation.

This coordinate (xrot, yrot, zrot) is used for celestial sphere corresponding point calculation in perspective projection.

As in FIG. 21B, the coordinate plane 131 is subjected to perspective projection onto a celestial sphere surface (region 132). That is, it is to obtain a point intersecting the spherical surface when a straight line is drawn from the coordinate toward the center of the celestial sphere. Each coordinate is calculated as follows.

$$x_{sph} = x_{rot} / \sqrt{x_{rot}^2 + y_{rot}^2 + z_{rot}^2}$$

$$y_{sph} = y_{rot} / \sqrt{x_{rot}^2 + y_{rot}^2 + z_{rot}^2}$$

$$z_{sph} = z_{rot} / \sqrt{x_{rot}^2 + y_{rot}^2 + z_{rot}^2}$$

[Expression 15]

In (Expression 15), xsph, ysph, and zsph are coordinates at which the coordinate on the coordinate plane 131 is projected to the coordinate on the surface of the celestial sphere model MT.

Image data in which plane projection has been performed in this relationship is obtained.

For example, a clipping region for an image projected onto a plane by the above-described technique is set in step ST19 in FIG. 14.

In step ST19, clipping region information CRA in the current frame is set on the basis of tracking processing by image analysis (subject recognition) or clipping region instruction information CRC according to the user operation.

Figure 22A:
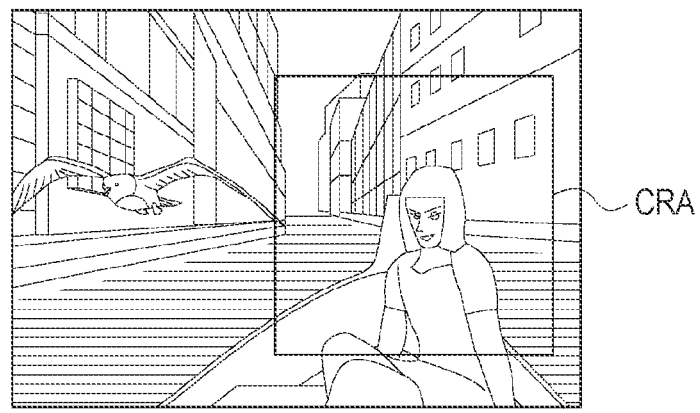
FIGS. 22A and 22B are explanatory diagrams of a clipping region of the embodiment.
Figure 22B:
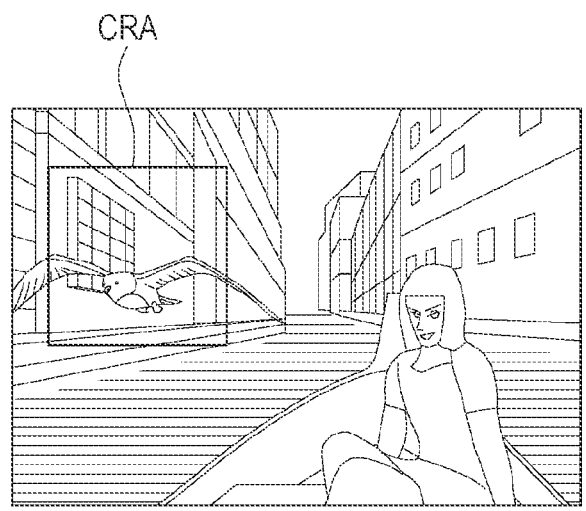

For example, FIGS. 22A and 22B illustrate, in a frame state, the clipping region information CRA set for an image of a certain frame.

Such clipping region instruction information CRC is set for each frame.

Note that the clipping region information CRA also reflects an instruction for an aspect ratio of an image by the user or automatic control.

The clipping region information CRA is reflected in the processing of step ST18. That is, as described above, the region corresponding to the clipping region information CRA is subjected to plane projection onto the celestial sphere model MT, and the output image data oPD is obtained.

The output image data oPD thus obtained is image data subjected to the shake change processing in step ST16.

By performing the processing of FIG. 14 every frame, when the output image data oPD is reproduced and displayed, an image to which a shake is added is displayed as shake production. Therefore, when the user performs an operation for inputting the shake change parameter PRM, an image to which shake production according to a user's intention is added is obtained. Such image data is displayed or stored as an image subjected to shake production.

Here, in the present embodiment, association recording/reproduction is performed as step ST20, for example. For example, the CPU 71 can perform association recording (for example, recording in the storage unit 79 or the removable recording medium 81 in FIG. 5) for each frame and can reproduce/transfer and output it as necessary.

As the association recording processing for each frame, the normalization shake information SCI is recorded in association with image data in units of frame, for example. Furthermore, it may be recorded in association with image-capturing time shake information and the shake change information SMI.

First, as image data in units of frame, in step ST12, the CPU 71 performs recording processing of the image data iPD (or the image data PD) for which the internal correction of the image-capturing apparatus has been canceled, and in response to this, performs recording processing of the normalization shake information SCI, that is, the normalized quaternion nQD.

Furthermore, the CPU 71 may perform recording processing of the quaternion QD for the frame, the timing information TM, and the camera parameter CP as image-capturing time shake information associated with this image data iPD.

FIG. 23 illustrates the metadata MTD1 supplied from the image source VS to the image processing apparatus TDx and the metadata MTD2 supplied by the image processing apparatus TDx to the image processing apparatus TDy, and they include the normalized quaternion nQD. Information corresponding to this metadata MTD2 is associated with each frame of the image data iPD.

Furthermore, the CPU 71 may perform recording processing of the shake change parameter PRM as the shake change information SMI associated with the image data iPD. Alternatively, instead of the shake change parameter PRM or together with the shake change parameter PRM, the shake change quaternion eQD may be recorded.

The image data iPD of each frame, the normalization shake information SCI (normalized quaternion nQD), and the like recorded in association in this manner are transferred to external equipment and made available.

FIG. 2 illustrates that the image data VD2, the metadata MTD2, the normalization shake information SCI, and the shake change information SMI are transmitted from the image processing apparatus TDx to the image processing apparatus TDy, but in the case of the example of FIG. 14, the image data VD2 is image data including the image data iPD. Furthermore, the metadata MTD2 includes the normalization shake information SCI as the content illustrated in FIG. 23, for example.

Thus, the image processing apparatus TDy becomes possible to easily perform reproduction of shake addition and shake partial removal based on the normalization shake information SCI applied in the image processing apparatus TDx in the past, adjustment and correction of shake addition, and accurate cancelation of the shake change.

<6. Summary and Modifications>

In the above embodiment, the following effects can be obtained.

The image processing apparatus TDx of the embodiment includes the shake information processing unit 101 (step ST15) that outputs output shake information of image data (input image data) constituting a movie. The image processing apparatus TDx further includes the shake information normalization unit 105 (step ST16) that obtains normalization shake information by normalizing output shake information on the basis of angle of view information. The image processing apparatus TDx further includes the shake change unit 100 (step ST17) that performs shake change processing of changing a shake state of image data using the normalization shake information SCI.

This makes it possible to achieve shake addition of a shake amount suitable for the output image data oPD (or shake remaining due to shake partial removal). That is, depending on the angle of view after clipping, shake is not more violent than expected or the shake amount is not too small any longer, and shake addition (or shake remaining due to shake partial removal) according to the user's intention can be achieved regardless of the angle of view.

In the embodiment, an example in which the shake change unit 100 performs shake addition to the input image data on the basis of the normalization shake information SCI as shake change processing is described.

For example, in the image processing apparatus TDx, the user performs an operation of instructing the shake amount as shake production, the shake change parameter PRM is input in response to it, the shake change quaternion eQD is generated and normalized, and the shake change processing of adding a shake as shake production is performed using the normalized quaternion nQD. It is possible to add a shake as production to a shake-free image, for example, and to further add a shake to an image with shake. This makes it possible to diversify image expression. Furthermore, in this case, shake addition of an appropriate shake amount can be achieved regardless of the angle of view of the output image data oPD.

In the embodiment, an example in which the shake change unit 100 performs shake partial removal of the input image data on the basis of the normalization shake information SCI as shake change processing is described.

In step ST17, for example, the image processing apparatus TDx can generate an image with a reduced shake by performing shake partial removal. For example, it is suitable in a case where it is desired to not eliminate but suppress a violent shake of an image with a violent shake. Also in this case, by performing shake change using the normalized quaternion nQD, remaining degree of shake does not differ depending on the angle of view any longer, and it is possible to achieve shake remaining according to the user's intention without depending on the angle of view.

In the embodiment, an example in which the angle of view information for normalization is a ratio between the angle of view of the target image to be subjected to the shake change processing and a reference angle of view is described.

That is, a certain reference angle of view is determined, and shake information is normalized using the ratio of angle of view with the reference angle of view. This makes it possible to express the degree of shake at the reference angle of view and equivalent shake regardless of the angle of view.

In the embodiment, an example in which angle of view information for normalization is the ratio of the image to be subjected to shake change processing between the angle of view after clipping and the angle of view at the time of image capturing is described.

That is, in a case where an output image is generated by clipping from a captured image, shake information with respect to the clipped image is normalized with reference to the angle of view of the captured image. This makes it possible to express a shake felt to be visually equivalent to the shake degree in a captured image even in a clipping image.

In the embodiment, an example of including the parameter setting unit 102 for setting a shake change parameter regarding shake change processing is described.

The shake change processing changes the state of a shake by reducing the shake occurring in the movie or adding a shake, and this shake change processing is performed on the basis of the shake change parameter PRM set by the parameter setting unit 102. For example, by generating a shake change parameter by using an archive of various shakes or by using a user input, it is possible to add, to the image, not a shake at the time of image capturing of an image but a shake as new production.

In the embodiment, an example of including the UI processing unit 103 that detects operation information regarding shake change and the parameter setting unit 102 that sets a shake change parameter regarding the shake change processing on the basis of the operation information detected by the UI processing unit 103 is described.

This makes it possible to provide the user with an operation environment for causing image processing of adding a shake to an image or partially removing a shake of an image to be executed.

In particular, by enabling a parameter for shake change to be visually operated on the UI screen, it is possible to provide a shake operation environment that is easy to understand for the user.

In the embodiment, an example in which the shake change parameter PRM is obtained by converting information of an angle detected by the UI processing unit 103 into the shake amount is described.

Specifically, the parameter setting unit 102 converts a shake amount designated in angle on a UI screen or the like into quaternion. This allows the user to designate the shake amount after change by an operation that makes it easy to image the shake amount by the angle.

In the embodiment, an example in which the shake information processing unit 101 generates output shake information (for example, the shake change quaternion eQD) on the basis of the shake change parameter PRM for designating the processing amount of shake change processing is described.

This makes it possible to perform processing of adding a shake to a shake-free image or increasing a shake, and possible to diversify image expression.

In the embodiment, an example in which the shake information processing unit 101 adjusts image-capturing time shake information (quaternion QD) on the basis of the shake change parameter PRM for designating the processing amount of shake change processing, and obtains output shake information (for example, the shake change quaternion eQD) is described.

This makes it possible to perform processing of generating an image with realistic feeling by reducing a shake applied to an image at the time of image capturing and leaving the shake without impairing visibility, and it is possible to diversify image expression.

In the embodiment, an example in which image-capturing time shake information is posture information of the image-capturing apparatus 1 at the time of image capturing of the input image data by the image-capturing apparatus 1 is described.

That is, the quaternion QD as posture information obtained from IMU data is used as image-capturing time shake information. This makes it possible to perform shake change on the basis of information for appropriately expressing a shake at the time of image capturing.

In the embodiment, an example in which the shake change unit 100 pastes each frame of input image data of the processing target to the celestial sphere model MT, and performs shake change by rotating it using the normalization shake information SCI (normalized quaternion nQD) corresponding to each frame is described.

By performing shake change correction by performing rotation to increase or decrease a shake for each frame on the celestial sphere model MT, it is possible to perform shake change without causing trapezoidal distortion. Therefore, a high-quality image with less distortion can be obtained as an image subjected to shake production.

The image processing apparatus TDx of the embodiment includes the association unit 106 (step ST20) that performs processing of associating image data with the normalization shake information SCI (for example, normalized quaternion nQD). This makes it possible to grasp, in the image processing apparatus TDy, for example, what kind of shake change has been performed by the shake change processing in the image processing apparatus TDx.

Then, in the image processing apparatus TDy, it becomes possible to perform processing such as redoing shake change processing as shake production, for example, adjusting the shake degree of shake production already performed, canceling the shake production, and the like.

Furthermore, in the image processing apparatus TDy, it is also possible to perform shake removal after canceling the shake production performed by the image processing apparatus TDx.

That is, each image processing apparatus makes it possible to discretionarily and variously change the shake state.

Note that it is conceivable that image data and normalized shake information associated with each other are recorded in a same file, for example. For example, a file including image data (and audio data) and metadata that constitute a movie, and normalized shake change information is configured. For example, the normalized shake change information can be included as metadata accompanying image data.

However, they are not necessarily recorded in the same file or the like. Even if the normalization shake information is recorded into a data file different from that of the image data, it is only sufficient to be in a form where it can be associated with each frame of the image data later. That is, any recording form may be adopted as long as the image processing apparatus TDy of the transmission destination can be acquire them in association with each other.

Furthermore, image-capturing time shake information may also be associated.

The program of the embodiment is a program for causing a CPU, a DSP, or a device including them to execute the processing as in FIG. 14.

That is, the program of the embodiment is a program that causes an information processing apparatus to execute shake information processing (ST15) of outputting output shake information for input image data constituting a movie, shake information normalization processing (ST16) of obtaining normalization shake information by normalizing the output shake information on the basis of angle of view information, and shake change processing (ST17) of changing a shake state of the input image data using the normalization shake information.

Such program makes it possible to achieve the above-described image processing apparatus TDx in equipment such as the mobile terminal 2, the personal computer 3, or the image-capturing apparatus 1.

Such program can be recorded in advance in an HDD as a recording medium built in equipment such as a computer apparatus, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, and a memory card. Such removable recording medium can be provided as so-called package software.

Furthermore, such program can be installed from a removable recording medium to a personal computer or the like, and can be downloaded from a download site via a network such as a local area network (LAN) or the Internet.

Furthermore, such program is suitable for widely providing the image processing apparatus TDx of the embodiment. For example, by downloading the program to a personal computer, a portable information processing apparatus, a mobile phone, a game console, video equipment, a personal digital assistant (PDA), and the like, the personal computer and the like can be caused to function as the image processing apparatus of the present disclosure.

Note that the effects described in the present description are merely examples and are not limited thereto, and other effects may be present.

Note that the present technology can also have the following configuration.

(1)
An image processing apparatus including:
a shake information processing unit configured to output output shake information for input image data constituting a movie;
a shake information normalization unit configured to obtain normalization shake information by normalizing the output shake information on the basis of angle of view information; and
a shake change unit configured to perform shake change processing of changing a shake state of the input image data using the normalization shake information.

(2)
The image processing apparatus according to (1), in which
the shake change unit performs shake addition to the input image data on the basis of the normalization shake information as the shake change processing.

(3)
The image processing apparatus according to (1) or (2), in which
the shake change unit performs shake partial removal of the input image data on the basis of the normalization shake information as the shake change processing.

(4)
The image processing apparatus according to any of (1) to (3), in which
the angle of view information is a ratio between an angle of view of a target image to be subjected to the shake change processing and a reference angle of view.

(5)
The image processing apparatus according to any of (1) to (3), in which
the angle of view information is a ratio of an image to be subjected to the shake change processing between an angle of view after clipping and an angle of view at the time of image capturing.

(6)
The image processing apparatus according to any of (1) to (5), further including
a parameter setting unit configured to set a shake change parameter related to the shake change processing.

(7)
The image processing apparatus according to any of (1) to (6), further including:
a user interface processing unit configured to detect operation information regarding shake change; and
a parameter setting unit configured to set a shake change parameter related to the shake change processing on the basis of operation information detected by the user interface processing unit.

(8)
The image processing apparatus according to (7), in which
the shake change parameter is obtained by converting information of an angle detected by the user interface processing unit into a shake amount.

(9)
The image processing apparatus according to any of (1) to (8), in which
the shake information processing unit generates the output shake information on the basis of a shake change parameter that designates a processing amount of the shake change processing.

(10)
The image processing apparatus according to any of (1) to (9), in which
the shake information processing unit obtains the output shake information by adjusting image-capturing time shake information on the basis of a shake change parameter that designates a processing amount of the shake change processing.

(11)
The image processing apparatus according to (10), in which
the image-capturing time shake information is posture information of the image-capturing apparatus at the time of image capturing of the input image data by an image-capturing apparatus.

(12)
The image processing apparatus according to any of (1) to (11), in which
the shake change unit pastes each frame of the input image data to a celestial sphere model, and performs the shake change processing by rotating each frame using the normalization shake information corresponding to each frame.

(13)
The image processing apparatus according to any of (1) to (12), further including
an association unit configured to associate the input image data with the normalization shake information.

(14)
An image processing method, in which
an image processing apparatus performs
shake information processing of outputting output shake information for input image data constituting a movie,
shake information normalization processing of obtaining normalization shake information by normalizing the output shake information on the basis of angle of view information, and
shake change processing of changing a shake state of the input image data using the normalization shake information.

(15)
A program that causes an information processing apparatus to execute
shake information processing of outputting output shake information for input image data constituting a movie,
shake information normalization processing of obtaining normalization shake information by normalizing the output shake information on the basis of angle of view information, and
shake change processing of changing a shake state of the input image data using the normalization shake information.

REFERENCE SIGNS LIST

1 Image-capturing apparatus
2 Mobile terminal

3 Personal computer
4 Server
5 Recording medium
70 Information processing apparatus
71 CPU
100 Shake change unit
100a Shake addition unit
100b Shake partial removal unit
101 Shake information processing unit
102 Parameter setting unit
103 UI processing unit
105 Shake information normalization unit
106 Association unit

The invention claimed is:

1. An image processing apparatus, comprising:
at least one processor configured to:
output output shake information for input image data that constitutes a movie, wherein the output shake information includes a designated shake remaining amount that indicates an amount of shake to be applied to the input image data;
obtain normalization shake information by normalization of the output shake information to adjust the amount of shake, wherein the normalization is based on angle of view information; and
perform a shake change process to apply the adjusted amount of shake to the input image data using the normalization shake information.

2. The image processing apparatus according to claim 1, wherein the at least one processor is further configured to perform shake addition to the input image data based on the normalization shake information as the shake change process.

3. The image processing apparatus according to claim 1, wherein the at least one processor is further configured to perform shake partial removal of the input image data based on the normalization shake information as the shake change process.

4. The image processing apparatus according to claim 1, wherein the angle of view information includes a ratio between an angle of view of a target image to be subjected to the shake change process and a reference angle of view.

5. The image processing apparatus according to claim 1, wherein the angle of view information includes a ratio of an image to be subjected to the shake change process between an angle of view after the image is clipped and an angle of view at a time of image capture.

6. The image processing apparatus according to claim 1, the at least one processor is further configured to set a shake change parameter related to the shake change process.

7. The image processing apparatus according to claim 1, the at least one processor is further configured to:
detect operation information regarding shake change; and
set a shake change parameter related to the shake change process based on the detected operation information.

8. The image processing apparatus according to claim 7, wherein
the operation information includes a rotation angle, and
the at least one processor is further configured to obtain the shake change parameter by conversion of information of the rotation angle the amount of shake.

9. The image processing apparatus according to claim 1, wherein the at least one processor is further configured to generate the output shake information based on a shake change parameter that designates a processing amount of the shake change process.

10. The image processing apparatus according to claim 1, wherein
the at least one processor is further configured to adjust image-capturing time shake information based on a shake change parameter to obtain the output shake information, and
the shake change parameter designates a processing amount of the shake change process.

11. The image processing apparatus according to claim 10, wherein the image-capturing time shake information includes posture information of an image-capturing apparatus at a time of image capture of the input image data by the image-capturing apparatus.

12. The image processing apparatus according to claim 1, wherein the at least one processor is further configured to:
paste each frame of the input image data to a celestial sphere model; and perform the shake change process by rotatation of each frame of the input image data using the normalization shake information corresponding to a respective frame of the input image data.

13. The image processing apparatus according to claim 1, the at least one processor is further configured to associate the input image data with the normalization shake information.

14. The image processing apparatus according to claim 1, wherein the shake change process is subsequent to a shake removal process performed at a time of image capture of the input image data by an image-capturing apparatus.

15. An image processing method, comprising:
in an image processing apparatus;
outputting output shake information for input image data constituting a movie, wherein the output shake information includes a designated shake remaining amount that indicates an amount of shake to be applied to the input image data;
obtaining normalization shake information by normalization of the output shake information to adjust the amount of shake, wherein the normalization is based on angle of view information; and
performing a shake change process to apply the adjusted amount of shake to the input image data using the normalization shake information.

16. A non-transitory computer-readable medium having stored thereon, computer executable instructions which, when executed by a computer, cause the computer to execute operations, the operations comprising:
outputting output shake information for input image data constituting a movie, wherein the output shake information includes a designated shake remaining amount that indicates an amount of shake to be applied to the input image data;
obtaining normalization shake information by normalization of the output shake information to adjust the amount of shake, wherein the normalization is based on angle of view information; and
performing a shake change process to apply the adjusted amount of shake to the input image data using the normalization shake information.

* * * * *